United States Patent
Va et al.

(10) Patent No.: US 12,276,747 B2
(45) Date of Patent: Apr. 15, 2025

(54) RADAR FOR FULL-BLOCKAGE DETECTION OF RADIO FREQUENCY MODULES IN MOBILE DEVICES

(71) Applicant: Samsung Electronics Co., Ltd., Suwon-si (KR)

(72) Inventors: Vutha Va, Plano, TX (US); Boon Loong Ng, Plano, TX (US); Anum Ali, Plano, TX (US); Jianhua Mo, Allen, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 303 days.

(21) Appl. No.: 17/657,943

(22) Filed: Apr. 4, 2022

(65) Prior Publication Data

US 2022/0413088 A1 Dec. 29, 2022

Related U.S. Application Data

(60) Provisional application No. 63/215,025, filed on Jun. 25, 2021.

(51) Int. Cl.
*G01S 7/00* (2006.01)
*G01S 13/08* (2006.01)
(Continued)

(52) U.S. Cl.
CPC .............. *G01S 7/006* (2013.01); *G01S 13/08* (2013.01); *G01S 13/86* (2013.01); *H04W 24/02* (2013.01)

(58) Field of Classification Search
CPC .......... G01S 7/006; G01S 13/08; G01S 13/86; H04W 24/02
(Continued)

(56) References Cited

U.S. PATENT DOCUMENTS

| 6,611,227 B1 * | 8/2003 | Nebiyeloul-Kifle .... G01S 7/412 |
| | | 342/195 |
| 7,702,291 B2 | 4/2010 | Hansen |

(Continued)

FOREIGN PATENT DOCUMENTS

| EP | 1529225 B1 | 7/2007 | |
| EP | 3779505 A1 * | 2/2021 | ............. G01S 13/34 |

(Continued)

OTHER PUBLICATIONS

International Search Report and Written Opinion issued Sep. 13, 2022 regarding International Application No. PCT/KR2022/007548, 7 pages.

(Continued)

*Primary Examiner* — Timothy A Brainard
*Assistant Examiner* — Samarina Makhdoom

(57) ABSTRACT

A method for radar full blockage detection includes transmitting, via a transceiver, radar signals for object detection. The method also includes determining whether an object is detected within a first threshold distance based on reflections of the radar signals that are received. In response to a determination that the object is detected within the first threshold distance, the method includes determining whether the object is detected beyond a second threshold distance, based on the reflections of the radar signals. The second threshold distance is further away from the electronic device than the first threshold distance. In response to determining that the object is within the first threshold distance and not detected beyond the second threshold distance, the method includes determining that the transceiver is fully blocked by the object. upon a determination that the transceiver is fully blocked, the method includes modifying a wireless communication operation associated with the transceiver.

20 Claims, 23 Drawing Sheets

(51) Int. Cl.
*G01S 13/86* (2006.01)
*H04W 24/02* (2009.01)

(58) Field of Classification Search
USPC ............................................ 342/357.31
See application file for complete search history.

(56) References Cited

U.S. PATENT DOCUMENTS

| | | | |
|---|---|---|---|
| 8,112,039 | B2 | 2/2012 | Bertagna |
| 2002/0163463 | A1 | 11/2002 | Lajiness et al. |
| 2009/0243912 | A1 | 10/2009 | Lohmeier et al. |
| 2015/0309165 | A1 | 10/2015 | Elwart et al. |
| 2016/0077134 | A1 | 3/2016 | Rezk et al. |
| 2017/0160392 | A1* | 6/2017 | Brisimitzakis ............ G01S 7/24 |
| 2017/0269196 | A1* | 9/2017 | Millar ...................... G01S 7/40 |
| 2017/0336506 | A1* | 11/2017 | Corcos ..................... G01S 7/03 |
| 2020/0404598 | A1* | 12/2020 | Landis ................ H04W 52/367 |
| 2020/0411960 | A1* | 12/2020 | Ng ......................... G01S 13/10 |
| 2021/0011147 | A1 | 1/2021 | Va et al. |
| 2021/0132209 | A1* | 5/2021 | Shtrom ................ G01S 13/347 |
| 2021/0175919 | A1* | 6/2021 | Badic ................ H04W 72/0446 |

FOREIGN PATENT DOCUMENTS

| | | | | |
|---|---|---|---|---|
| KR | 10-2015-0100395 A | | 9/2015 | |
| KR | 10-2020-0107487 A | | 9/2020 | |
| KR | 20200107487 | * | 9/2020 | ............... G01S 7/40 |

OTHER PUBLICATIONS

Extended European Search Report issued Jun. 11, 2024 regarding Application No. 22828633.2, 8 pages.

* cited by examiner

RADAR FOR FULL-BLOCKAGE DETECTION OF RADIO FREQUENCY MODULES IN MOBILE DEVICES

CROSS-REFERENCE TO RELATED APPLICATION AND CLAIM OF PRIORITY

This application claims priority under 35 U. S.C. § 119(e) to U.S. Provisional Patent Application No. 63/215,025 filed on Jun. 25, 2021. The above-identified provisional patent application is hereby incorporated by reference in its entirety.

TECHNICAL FIELD

This disclosure relates generally to electronic devices. More specifically, this disclosure relates to radar for full-blockage detection of radio frequency modules in mobile devices.

BACKGROUND

The use of mobile computing technology such as a portable electronic device has greatly expanded largely due to usability, convenience, computing power, and the like. One result of the recent technological development is that electronic devices are becoming more compact, while the number of functions and features that a given device can perform is increasing. For example, certain electronic devices not only provide voice call services or internet browsing using a mobile communication network but can also offer radar capabilities.

5th generation (5G) or new radio (NR) mobile communications is recently gathering increased momentum with all the worldwide technical activities on the various candidate technologies from industry and academia. The candidate enablers for the 5G/NR mobile communications include massive antenna technologies, from legacy cellular frequency bands up to high frequencies, to provide beamforming gain and support increased capacity, new waveform (e.g., a new radio access technology (RAT)) to flexibly accommodate various services/applications with different requirements, new multiple access schemes to support massive connections, and so on. With the increase of mobile communication, care must be taken to minimize radio frequency exposure to the user of the electronic device.

SUMMARY

This disclosure provides radar for full-blockage detection of radio frequency modules in mobile devices.

In one embodiment, electronic device is provided. The electronic device includes a transceiver and a processor. The processor is operably connected to the transceiver. The processor is configured to transmit, via the transceiver, radar signals for object detection. The processor is also configured to determine whether an object is detected within a first threshold distance based on reflections of the radar signals that are received. In response to a determination that the object is detected within the first threshold distance, the processor is configured to determine whether the object is detected beyond a second threshold distance, based on the reflections of the radar signals. The second threshold distance is further away from the electronic device than the first threshold distance. In response to determining that the object is within the first threshold distance and not detected beyond the second threshold distance, the processor is configured to determine that the transceiver is fully blocked by the object. Upon a determination that the transceiver is fully blocked, the processor is configured to modify a wireless communication operation associated with the transceiver.

In another embodiment, a method is provided. The method includes transmitting, via a transceiver, radar signals for object detection. The method also includes determining whether an object is detected within a first threshold distance based on reflections of the radar signals that are received. In response to a determination that the object is detected within the first threshold distance, the method includes determining whether the object is detected beyond a second threshold distance, based on the reflections of the radar signals. The second threshold distance is further away from the electronic device than the first threshold distance. In response to determining that the object is within the first threshold distance and not detected beyond the second threshold distance, the method includes determining that the transceiver is fully blocked by the object. upon a determination that the transceiver is fully blocked, the method includes modifying a wireless communication operation associated with the transceiver.

In yet another embodiment a non-transitory computer readable medium embodying a computer program is provided. The computer program comprising computer readable program code that, when executed by a processor of an electronic device, causes the processor to transmit via a transceiver, radar signals for object detection; determine whether an object is detected within a first threshold distance based on reflections of the radar signals that are received; in response to a determination that the object is detected within the first threshold distance, determine whether the object is detected beyond a second threshold distance, based on the reflections of the radar signals, wherein the second threshold distance is further away from the electronic device than the first threshold distance; in response to determining that the object is within the first threshold distance and not detected beyond the second threshold distance, determine that the transceiver is fully blocked by the object; and upon a determination that the transceiver is fully blocked, modify a wireless communication operation associated with the transceiver.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
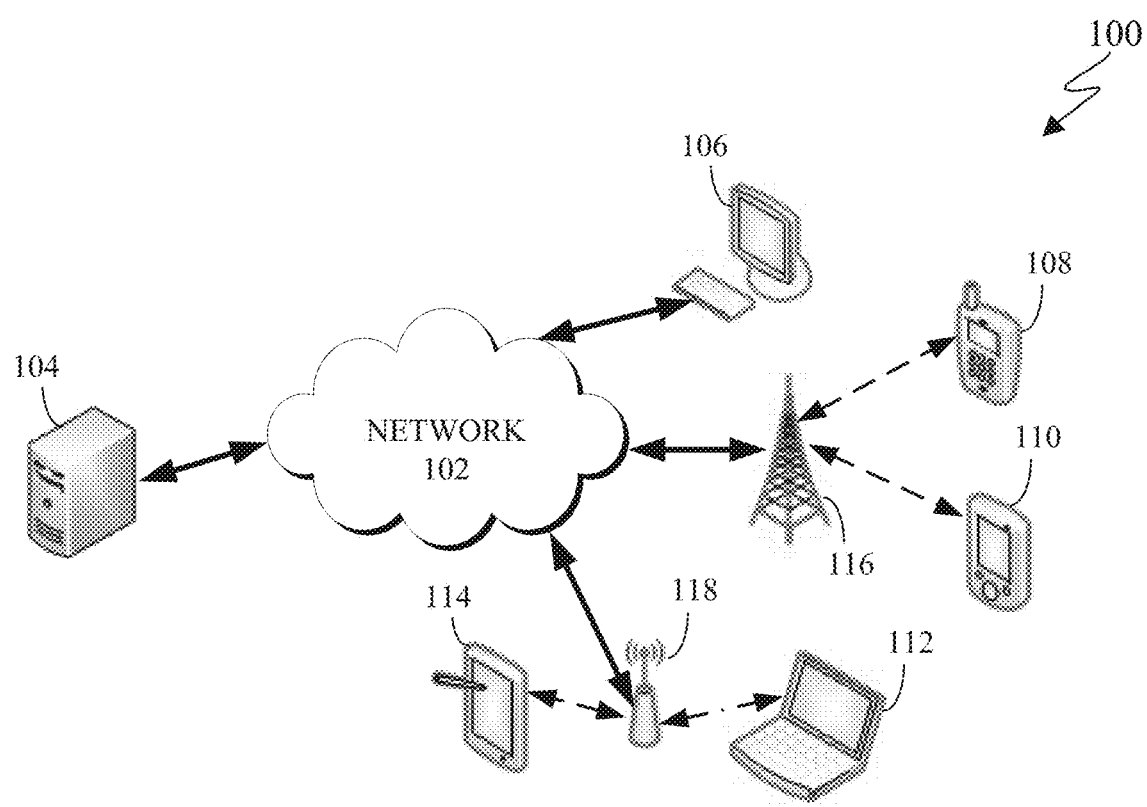
FIG. 1 illustrates an example communication system in accordance with an embodiment of this disclosure.

FIGS. 1 through 13, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably-arranged system or device.

To meet the demand for wireless data traffic having increased since deployment of the fourth generation (4G) communication systems, efforts have been made to develop and deploy an improved 5th generation (5G) or pre-5G or new radio (NR) communication system. Therefore, the 5G or pre-5G communication system is also called a "beyond 4G network" or a "post long term evolution (LTE) system."

The 5G communication system is considered to be implemented in higher frequency (such as millimeter wave (mm-Wave)) bands, e.g., 28 GHz or 60 GHz bands, so as to accomplish higher data rates or in lower frequency bands, such as 6 GHz, to enable robust coverage and mobility support. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, coordinated multi-points (CoMP), reception-end interference cancellation and the like.

An electronic device, according to embodiments of the present disclosure can include a user equipment (UE) such as a 5G terminal. The electronic device can also refer to any component such as mobile station, subscriber station, remote terminal, wireless terminal, receive point, vehicle, or user device. The electronic device could be a mobile telephone, a smartphone, a monitoring device, an alarm device, a fleet management device, an asset tracking device, an automobile, a desktop computer, an entertainment device, an infotainment device, a vending machine, an electricity meter, a water meter, a gas meter, a security device, a sensor device, an appliance, and the like. Additionally, the electronic device can include a personal computer (such as a laptop, a desktop), a workstation, a server, a television, an appliance, and the like. In certain embodiments, an electronic device can be a portable electronic device such as a portable communication device (such as a smartphone or mobile phone), a laptop, a tablet, an electronic book reader (such as an e-reader), a personal digital assistants (PDAs), a portable multimedia player (PMP), an MP3 player, a mobile medical device, a virtual reality headset, a portable game console, a camera, and a wearable device, among others. Additionally, the electronic device can be at least one of a part of a piece of furniture or building/structure, an electronic board, an electronic signature receiving device, a projector, or a measurement device. The electronic device is one or a combination of the above-listed devices. Additionally, the electronic device as disclosed herein is not limited to the above-listed devices and can include new electronic devices depending on the development of technology. It is noted that as used herein, the term "user" may denote a human or another device (such as an artificial intelligent electronic device) using the electronic device.

Figure 4A:
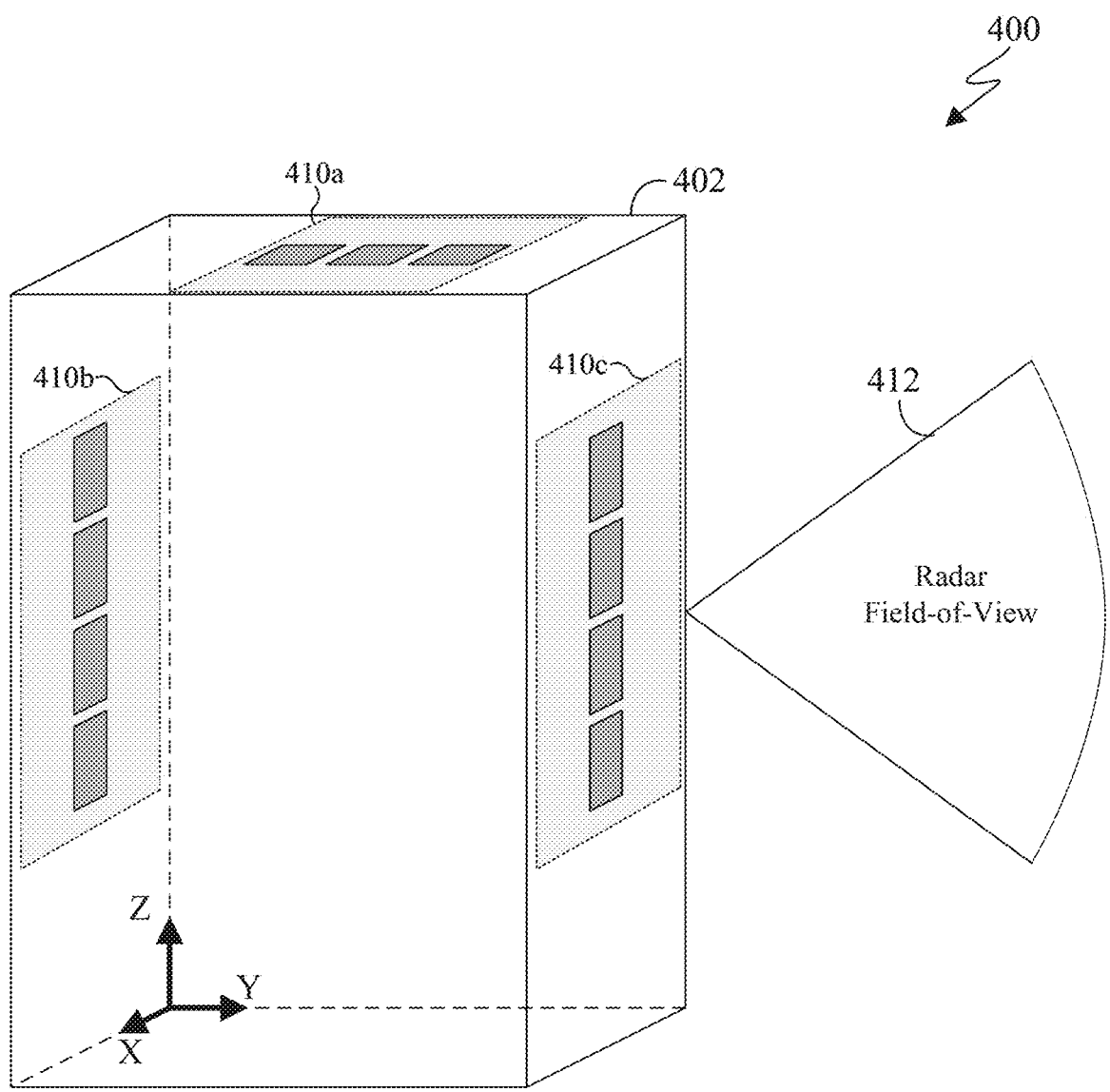
FIG. 4A illustrates a diagram of an electronic device with a field-of-view (FoV) corresponding to beams according to embodiments of this disclosure.
Figure 4B:
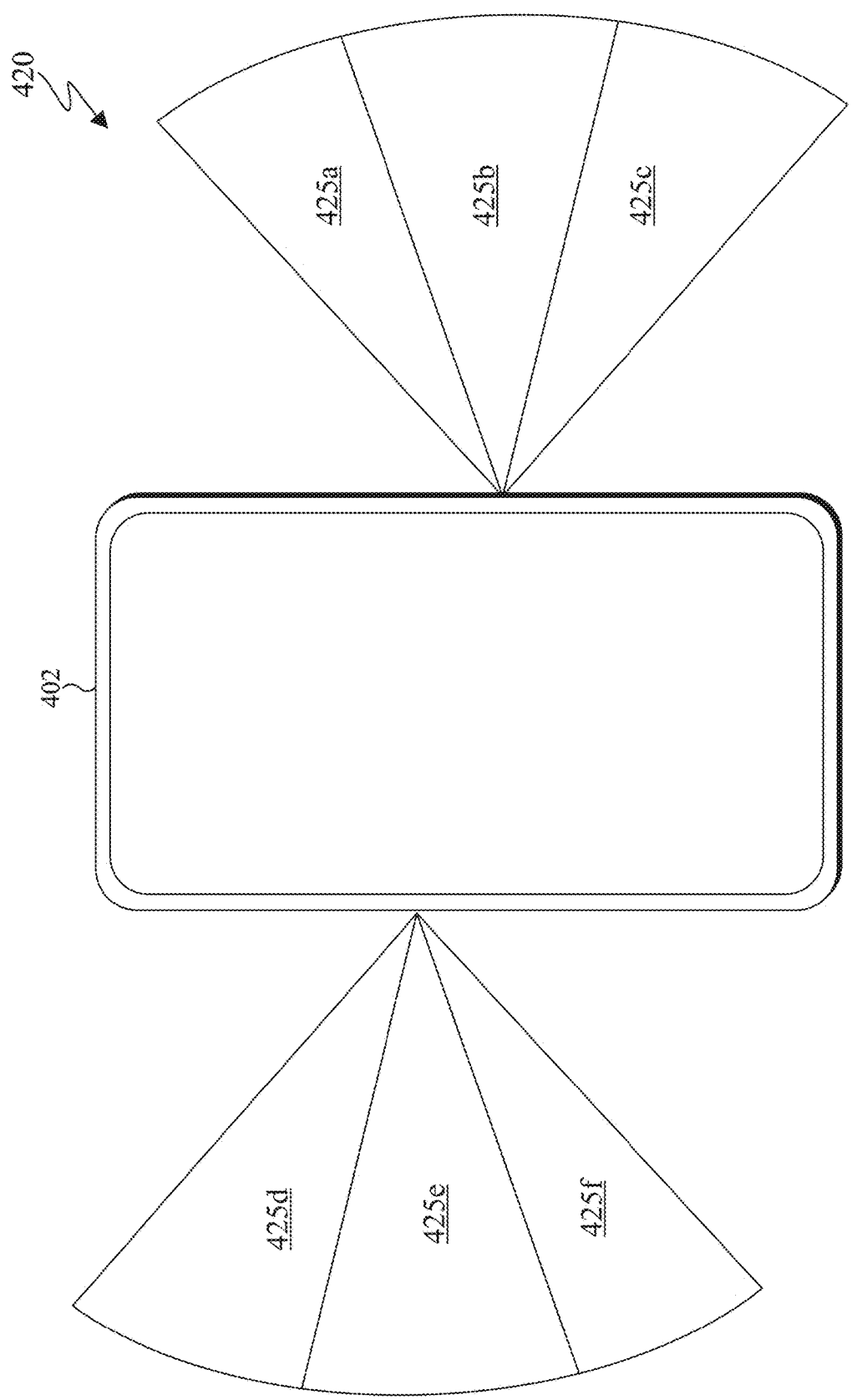
FIG. 4B illustrates a diagram of an electronic device with multiple field of view regions corresponding to beams according to embodiments of this disclosure.

Beamforming is typically used at both the infrastructure or network side (such as at the base station or the access point) and the UE side. For example, beamforming is an important factor when an electronic device (such as a UE) tries to establish a connection with a base station (BS). To compensate for the increasing path loss at high frequencies, analog beams sweeping can be employed to support narrow beams that enable wider signal reception or transmission coverage for the UE. A beam codebook comprises a set of codewords, where a codeword is a set of analog phase shift values, or a set of amplitude plus phase shift values, applied to the antenna elements, in order to form an analog beam. FIGS. 4A and 4B, described below, illustrates a UE equipped with mmWave antenna module(s) or panel(s) located on one or more of the edges of the UE. A beam management procedure is implemented at the UE to maintain the best antenna module as well as the corresponding best beam of the antenna module for signal reception and transmission by the UE. The UE may also use multiple antenna modules simultaneously, in which case the beam management procedure can determine the best beam of each antenna module for signal reception and transmission by the UE.

Embodiments of the present disclosure take into consideration that operating mmWave communications poses several challenges. First due to the stringent propagation condition at mmWave frequencies, beam forming is used, but finding the best beam for the communication requires overhead. Embodiments of the present disclosure describe methods to reduce the overhead, whenever possible. Additionally, the use of beam forming at the electronic device can introduce health concerns due to radio frequency (RF) exposure. Accordingly, embodiments of the present disclosure describe methods to sense the blockage status of the communication interface to reduce overhead, and/or mitigate exposure concerns.

Embodiments of the present disclosure take into consideration that beamforming is a used for reliable mmWave communications but at the same time beamforming also can cause a concern for radio frequency exposure on human body, beyond various governmental regulations. The process of beamforming is to adjust the antenna weights such that the transmission energy is concentrated in some direction. This focus of energy can help provide strong link signal for communications, but at the same time this means more radiation power in that direction and could raise concern on the exposure to body of the user. Due to such health concern, regulatory bodies (such as the Federal Communications Commission (FCC) in the United States of America) have sets of regulations and guidance governing such exposure. Exposure includes both exposure at low frequency (<6 GHz) and exposure at high frequency (>6 GHz). Power density (PD) is used as the exposure metric at high frequency.

Exposure limit poses a challenge regarding 5G millimeter wave uplink (UL). As discussed above, narrow beams (formed by beamforming techniques) are used for 5G millimeter wave operation, however, beamforming increases the PD and, consequently, the exposure. Certain mmWave communications take a very conservative measure to meet the exposure regulations. For example, one such approach is to use low enough Equivalent Isotropically Radiated Power (EIRP) by adjusting the duty cycle and either (i) lowering the transmit (TX) power, (ii) lowering the beamforming gain, or (iii) both lower the TX power and the beamforming gain.

Embodiments of the present disclosure take into consideration that while such a conservative measure can ensure regulatory compliance, it forces the communication operations of an electronic device to operate at suboptimal link quality and thus the electronic device cannot reap the potential for very high data rate services. For example, some solutions (non-sensing solutions) assume worst case exposure. Embodiments of the present disclosure take into consideration that to guard against exceeding the limit, using low power, using wide beams, or a combination thereof. Using low power or wide beams can limit UL quality in both coverage and throughput.

Accordingly, embodiments of the present disclosure relate to using radar to assess a situation by sensing the surroundings of the electronic device. By assessing the situation, the electronic device can avoid a pessimistic TX power control. For example, a smart exposure control solution can keep exposure compliance while minimizing the opportunity loss for communication beamforming operations.

Embodiments of the present disclosure describe using radar to determine whether the communication interface of an electronic device (such as a UE) is fully blocked, or not fully blocked (such as when the communication interface is partially blocked or unobstructed). Upon detecting an object, the electronic device can manage the beams for communication to maintain regulatory RF exposure compliance while operating at enhanced link quality.

Radar sensing can be used for ranging, angle estimation or both. In certain embodiments, an electronic device, using radar, can determine whether a communication interface (such as the mmWave module) of the electronic device is blocked. Full-blockage is a situation where an object (such as a hand) blocks the entire field-of-view (FoV) of a communication interface (a mmWave module) of the electronic device. A direct detection of such a full-blockage situation can be determined for each direction if the radar can detect a target (also referred to as an object). Direct full-blockage detection is difficult, due to various factors. For example, direct full-blockage detection often utilizes a very high angular resolution, which requires a large antenna array size that cannot be fitted into various electronic devices such as a mobile device. Also, even if angular resolution allows, such a detection would require scanning all angular directions and could require a large amount of resources (e.g., battery power and time to operate radar).

Full blockage of the communication interface can occur when there is an object covering the entire FoV of the mmWave antenna module. If the communication interface (which includes a mmWave antenna module) is fully blocked then the wireless signal for communication can be weak or non-existent. The communication interface can be blocked by an external object such as a hand of a user, an accessory or peripheral device, or the like. If a human body part (such as a hand of the user holding electronic device) blocks the mmWave antenna module, then the link quality can be degraded as well as exposure management concerns to arise, as described below. If the object is blocked by an inanimate object, such a protection case for the electronic device, the object can be formed of a certain material that inadvertently blocks or reduces the wireless communication ability of the electronic device. As such, if the electronic device is able to detect the presence of the inanimate object, (such as by using radar) the electronic device can instruct the user to remove the external object for increasing communication signal strength. Therefore, by determining whether the communication interface is blocked, can improve beam operations for mmWave communication signals by improving the link quality in both signal strength and stability.

For example, if the communication interface, which is used for mmWave communications, is blocked by an external object (such as a body part of a user, an accessory of the electronic device (i.e., a protective cover)) then there is no need to perform beamforming measurements. Forgoing beamforming measurements can save processing power overhead. Accordingly, embodiments of the present disclosure describe methods for determining whether a communication interface is blocked.

Embodiments of the present disclosure take into consideration that due to the limited angular resolution capability of radar an indirect method for angle estimation is needed. For example, angular resolution using radar is based on the number of antennas. Since certain electronic devices have a limited number of antennas thereby decreasing the angular resolution capability of radar. Accordingly, embodiments of the present disclosure relate to determining whether the communication interface is blocked using an indirect detection method for.

As described above, radar sensing can be used for ranging, angle estimation or both. For example, when radar is used for ranging only, the electronic device can determine whether a human body part is present at a close distance and adjust the TX power. For another example, when radar is used for ranging and angle estimation, the electronic device can determine whether a human body part is present and its approximate location and adjust the TX power, for beamforming, based on the location of the human body part. For instance, the electronic device can reduce the TX power at or near the location of the human body part and increase the TX power at locations where the human body part is absent. For yet another example, when radar is used for ranging and angle, the electronic device can determine whether a human body part is present and its approximate location and modify one or more beams for beamforming based on the location of the human body part. In this example, the angle information can be used to identify if the body part is within the main beam direction of certain beams.

For example, the electronic device can determine whether a body part of a human is within a FoV of a communication interface. Then depending on radar capabilities, the electronic device can modify an operation of the communication interface to maintain exposure compliance.

Embodiments of the present disclosure also take into consideration that the regulatory bodies limit exposure due to such health concern with respect to a human body and not inanimate objects. Accordingly, embodiments of the present disclosure relate to using radar to distinguish between a human body part and an inanimate object, such as a table. One way to distinguish body part from other objects (such as inanimate objects) is to rely on movement. For example, there are always some micro-movement of the live body (such as breathing cycles or some other involuntary muscle activities). While micro-movements are a good identifier of a human body, it can be quite challenging to reliably detect these minor movements as it may require a very long radar frame duration.

Embodiments of the present disclosure further take into consideration that while longer processing frames are able to identify small movements of the human body, it can introduce ambiguity in angle estimation. For example, if the object is moving then the electronic device may be unable to determine the angle that the object is relative to the electric device due to a smearing effect. Accordingly, embodiments of the present disclosure relate to determining whether to use a single radar frame or multiple radar frames for determining whether the communication interface is blocked.

Figure 4C:
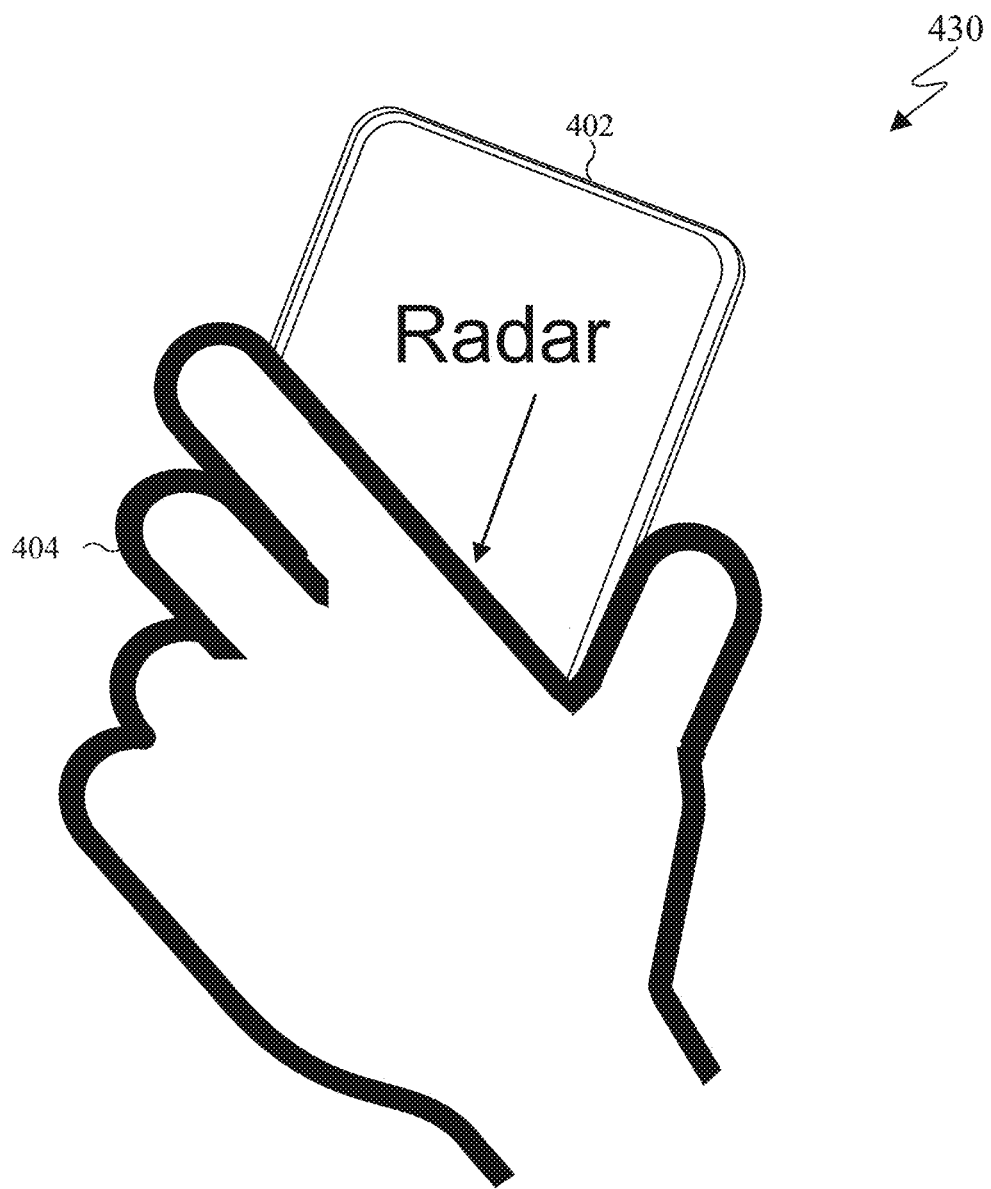
FIG. 4C illustrates a diagram of an electronic device being held according to embodiments of this disclosure.
Figure 4D:
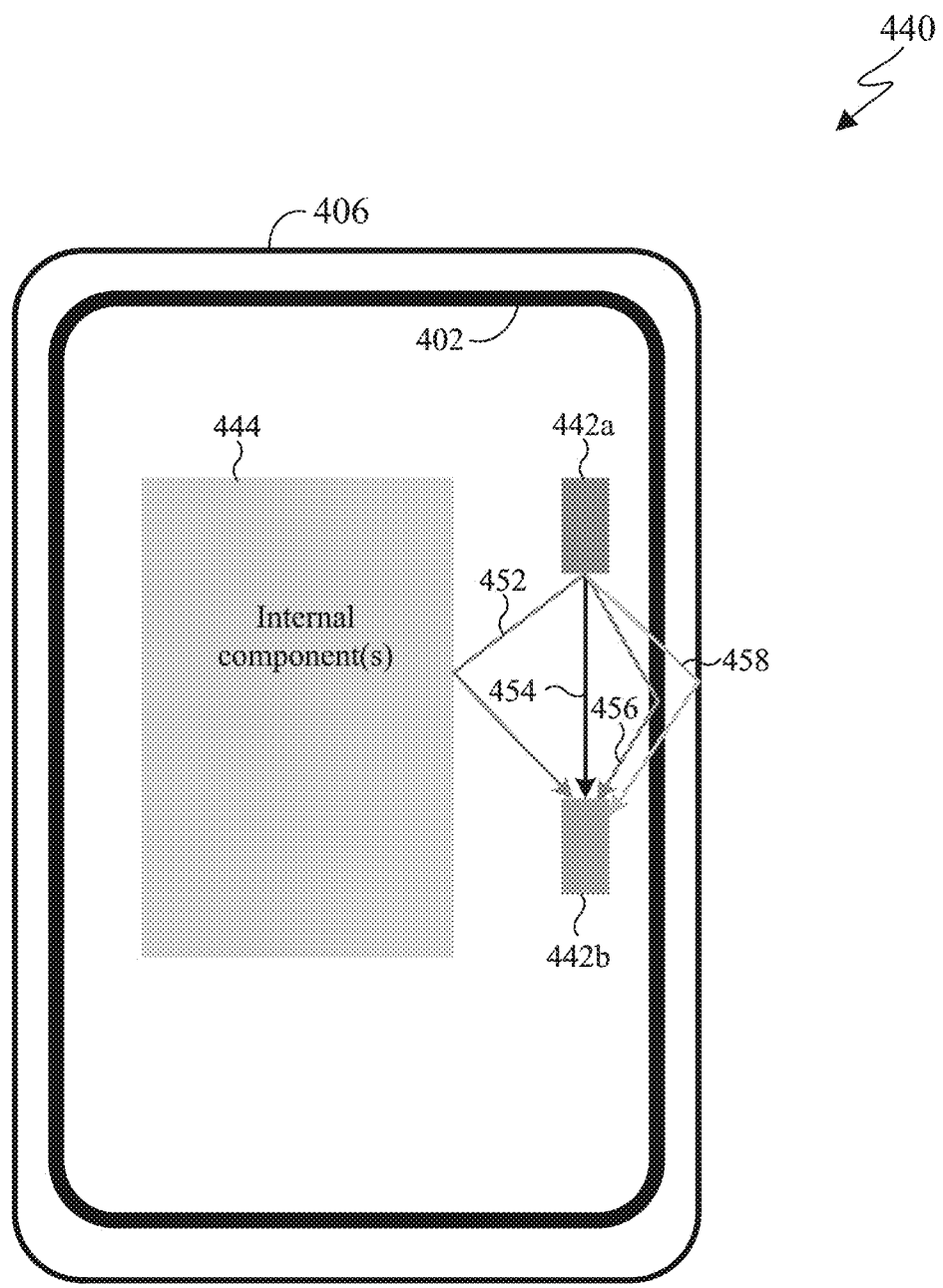
FIG. 4D illustrates a diagram of an electronic device with a phone case that is detected using radar signals according to embodiments of this disclosure.

Embodiments of the present disclosure describe systems and methods for indirect full blockage detection using certain criteria. For example, if the electronic device detects an object at a close range and does not detect any objects at a far range (such as when no other objects are detected beyond the object that is detected at the close range) the electronic device can determine that the communication interface is blocked. If the electronic device determines that the mmWave module of a communication interface is fully blocked, there is no point to search for a good beam from that module. An illustrative example is shown in FIGS. 4C and 4D where full-blockage is caused by the user holding an electronic device (FIG. 4C) or a case of the electronic device limits the signals (FIG. 4D). This kind of situation is common happening for mobile devices such as a smartphone where the user may hold the device and have their fingers and/or palm blocking the area where the mmWave module may be positioned. Upon determining the communication interface is blocked, the electronic device can search on other 5G modules not fully blocked. Similarly, regarding the RF exposure concern, the mmWave module should not transmit (or transmit with low enough power) when detecting full blockage to avoid violating regulations.

Another usage of blockage detection includes detecting a non-compliant accessory on an electronic device. For example, a user may use a third-party case and/or apply some customized decoration to a case for protecting an electronic device. The user might not be aware of the location of the mmWave module such that the phone case could block some of the modules, such as illustrated in FIG. 4D. With blockage detection, the electronic device could detect such situation with persistent full-blockage and could notify the user about the anomaly.

Embodiments of the present disclosure also describe systems and methods for performing blockage detection using radar where the radar and the mmWave module (e.g., 5G or 60 GHz WiFi such as IEEE802.11ay) are collocated. The radar and the mmWave communication module may or may not share the same antennas. Due to the small wavelength at mmWave frequencies, radar module could be designed to be small enough that it could share a limited space next to mmWave communication module. In some implementation, the radar may share RF components with the communication module or share the waveform of the communication module so that the resources used for radar operation is minimal. It is noted that radar is a versatile sensor that can detect range, speed, and angles (assuming it has an antenna array). Radar can detect a nearby target to sense the surrounding such as proximity sensing. Using sequence of detection, it can provide complex functionality like gesture recognition.

Embodiments of the present disclosure also describe systems and methods for radar detection to determine if the radar module and thus the 5G communication module (since they are collocated) is fully blocked. In certain embodiments, an electronic device can determine whether its communication interface is blocked based on a determination, using radar, that a target is detected as a close range (distance) and that no other objects are detected at a far range (distance).

Embodiments of the present disclosure also describe systems and methods for using one or multiple radar frames for determining whether the communication interface is blocked. For example, the electronic device can determine whether to use one or multiple radar frames when determining whether the communication interface is blocked. For example, multiple radar frames can be processed at a same or similar time. In certain embodiments, at least one of these radar frames can have non-uniformly spaced radar pulses (as defined in FIGS. 3B and 3D).

Embodiments of the present disclosure further describe systems and methods for exploiting temporal correlations of whether the communication interface is blocked. For example, a blockage state can be used to avoid oscillation of the detection results (such as jumping between full-blockage and not full-blockage detection). That is, while full-blockage state is active (on), if the radar detects a target at a far-range tap, it can indicate the device is no longer in a full blockage state.

While the descriptions of the embodiments of the present disclosure, describe a radar based system for object detection, the embodiments can be applied to any other radar based and non-radar based recognition systems. That is, the embodiments of the present disclosure are not restricted to radar and can be applied to other types of sensors (such as an ultra-sonic sensor) that can provide both range, angle, speed measurements, or any combination thereof. It is noted that when applying the embodiments of the present disclosure using a different type of sensor (a sensor other than a radar transceiver), various components may need to be tuned accordingly.

FIG. 1 illustrates an example communication system 100 in accordance with an embodiment of this disclosure. The embodiment of the communication system 100 shown in FIG. 1 is for illustration only. Other embodiments of the communication system 100 can be used without departing from the scope of this disclosure.

The communication system 100 includes a network 102 that facilitates communication between various components in the communication system 100. For example, the network 102 can communicate IP packets, frame relay frames, Asynchronous Transfer Mode (ATM) cells, or other information between network addresses. The network 102 includes one or more local area networks (LANs), metropolitan area networks (MANs), wide area networks (WANs), all or a portion of a global network such as the Internet, or any other communication system or systems at one or more locations.

In this example, the network 102 facilitates communications between a server 104 and various client devices 106-114. The client devices 106-114 may be, for example, a smartphone (such as a UE), a tablet computer, a laptop, a personal computer, a wearable device, a head mounted display, or the like. The server 104 can represent one or more servers. Each server 104 includes any suitable computing or processing device that can provide computing services for one or more client devices, such as the client devices 106-114. Each server 104 could, for example, include one or more processing devices, one or more memories storing instructions and data, and one or more network interfaces facilitating communication over the network 102.

Each of the client devices 106-114 represent any suitable computing or processing device that interacts with at least one server (such as the server 104) or other computing device(s) over the network 102. The client devices 106-114 include a desktop computer 106, a mobile telephone or mobile device 108 (such as a smartphone), a PDA 110, a laptop computer 112, and a tablet computer 114. However, any other or additional client devices could be used in the communication system 100, such as wearable devices. Smartphones represent a class of mobile devices 108 that are handheld devices with mobile operating systems and integrated mobile broadband cellular network connections for voice, short message service (SMS), and Internet data communications. In certain embodiments, any of the client devices 106-114 can emit and collect radar signals via a measuring (or radar) transceiver.

In this example, some client devices 108-114 communicate indirectly with the network 102. For example, the mobile device 108 and PDA 110 communicate via one or more base stations 116, such as cellular base stations or eNodeBs (eNBs) or gNodeBs (gNBs). Also, the laptop computer 112 and the tablet computer 114 communicate via one or more wireless access points 118, such as IEEE 802.11 wireless access points. Note that these are for illustration only and that each of the client devices 106-114 could communicate directly with the network 102 or indirectly with the network 102 via any suitable intermediate device(s) or network(s). In certain embodiments, any of the client devices 106-114 transmit information securely and efficiently to another device, such as, for example, the server 104.

Although FIG. 1 illustrates one example of a communication system 100, various changes can be made to FIG. 1. For example, the communication system 100 could include any number of each component in any suitable arrangement. In general, computing and communication systems come in a wide variety of configurations, and FIG. 1 does not limit the scope of this disclosure to any particular configuration. While FIG. 1 illustrates one operational environment in which various features disclosed in this patent document can be used, these features could be used in any other suitable system.

Figure 2:
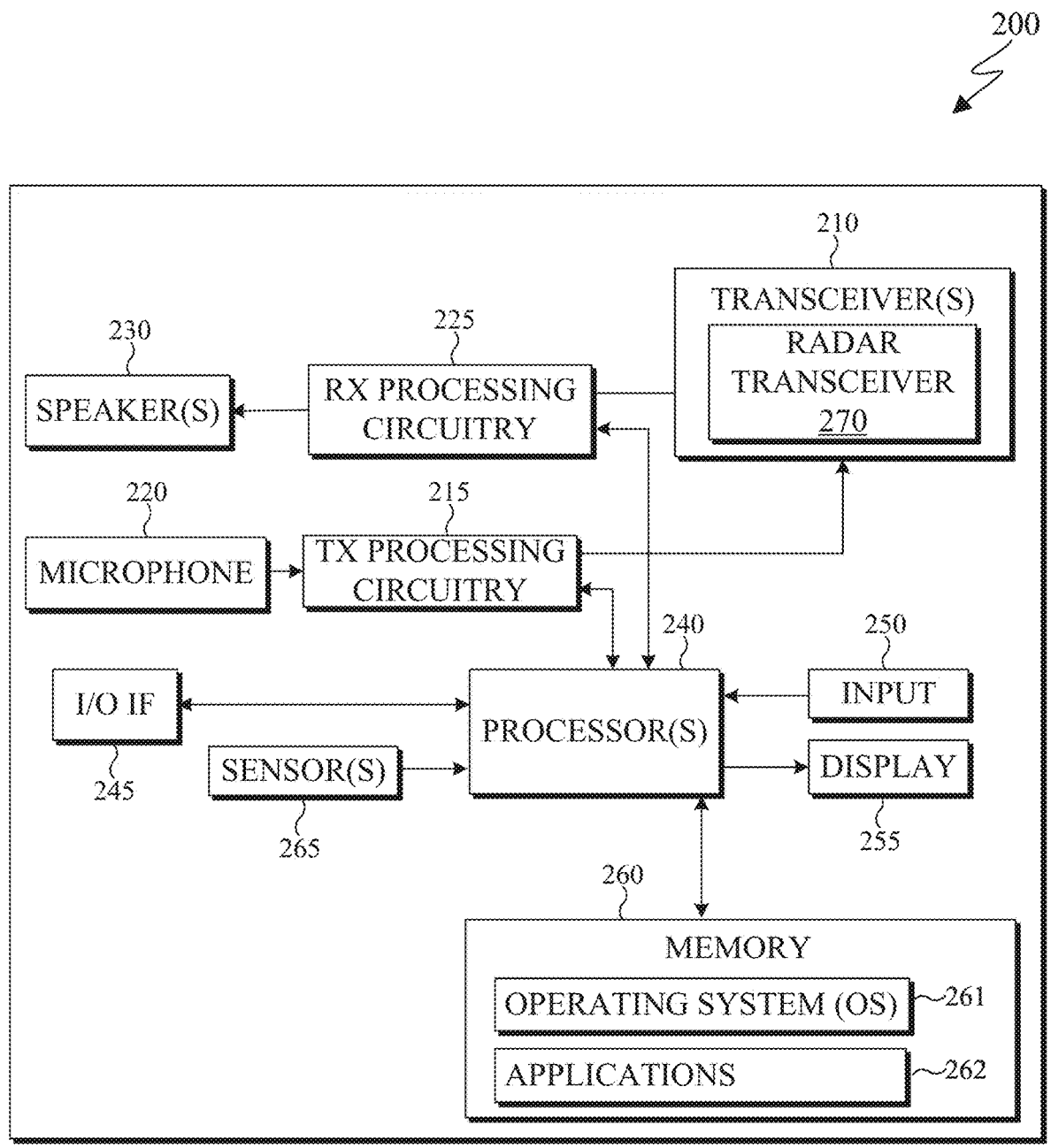
FIG. 2 illustrates an example electronic device in accordance with an embodiment of this disclosure.

FIG. 2 illustrates an example electronic device in accordance with an embodiment of this disclosure. In particular, FIG. 2 illustrates an example electronic device 200, and the electronic device 200 could represent the server 104 or one or more of the client devices 106-114 in FIG. 1. The electronic device 200 can be a mobile communication device, such as, for example, a UE, a mobile station, a subscriber station, a wireless terminal, a desktop computer (similar to the desktop computer 106 of FIG. 1), a portable electronic device (similar to the mobile device 108, the PDA 110, the laptop computer 112, or the tablet computer 114 of FIG. 1), a robot, and the like.

As shown in FIG. 2, the electronic device 200 includes transceiver(s) 210, transmit (TX) processing circuitry 215, a microphone 220, and receive (RX) processing circuitry 225.

The transceiver(s) 210 can include, for example, a RF transceiver, a BLUETOOTH transceiver, a WiFi transceiver, a ZIGBEE transceiver, an infrared transceiver, and various other wireless communication signals. The electronic device 200 also includes a speaker 230, a processor 240, an input/output (I/O) interface (IF) 245, an input 250, a display 255, a memory 260, and a sensor 265. The memory 260 includes an operating system (OS) 261, and one or more applications 262.

The transceiver(s) 210 can include an antenna array including numerous antennas. For example, the transceiver(s) 210 can be equipped with multiple antenna elements. There can also be one or more antenna modules fitted on the terminal where each module can have one or more antenna elements. The antennas of the antenna array can include a radiating element composed of a conductive material or a conductive pattern formed in or on a substrate. The transceiver(s) 210 transmit and receive a signal or power to or from the electronic device 200. The transceiver(s) 210 receives an incoming signal transmitted from an access point (such as a base station, WiFi router, or BLUETOOTH device) or other device of the network 102 (such as a WiFi, BLUETOOTH, cellular, 5G, LTE, LTE-A, WiMAX, or any other type of wireless network). The transceiver(s) 210 down-converts the incoming RF signal to generate an intermediate frequency or baseband signal. The intermediate frequency or baseband signal is sent to the RX processing circuitry 225 that generates a processed baseband signal by filtering, decoding, and/or digitizing the baseband or intermediate frequency signal. The RX processing circuitry 225 transmits the processed baseband signal to the speaker 230 (such as for voice data) or to the processor 240 for further processing (such as for web browsing data).

The TX processing circuitry 215 receives analog or digital voice data from the microphone 220 or other outgoing baseband data from the processor 240. The outgoing baseband data can include web data, e-mail, or interactive video game data. The TX processing circuitry 215 encodes, multiplexes, and/or digitizes the outgoing baseband data to generate a processed baseband or intermediate frequency signal. The transceiver(s) 210 receives the outgoing processed baseband or intermediate frequency signal from the TX processing circuitry 215 and up-converts the baseband or intermediate frequency signal to a signal that is transmitted.

The processor 240 can include one or more processors or other processing devices. The processor 240 can execute instructions that are stored in the memory 260, such as the OS 261 in order to control the overall operation of the electronic device 200. For example, the processor 240 could control the reception of forward channel signals and the transmission of reverse channel signals by the transceiver(s) 210, the RX processing circuitry 225, and the TX processing circuitry 215 in accordance with well-known principles. The processor 240 can include any suitable number(s) and type(s) of processors or other devices in any suitable arrangement. For example, in certain embodiments, the processor 240 includes at least one microprocessor or microcontroller. Example types of processor 240 include microprocessors, microcontrollers, digital signal processors, field programmable gate arrays, application specific integrated circuits, and discrete circuitry. In certain embodiments, the processor 240 can include a neural network.

The processor 240 is also capable of executing other processes and programs resident in the memory 260, such as operations that receive and store data. The processor 240 can move data into or out of the memory 260 as required by an executing process. In certain embodiments, the processor 240 is configured to execute the one or more applications 262 based on the OS 261 or in response to signals received from external source(s) or an operator. Example, applications 262 can include a multimedia player (such as a music player or a video player), a phone calling application, a virtual personal assistant, and the like.

The processor 240 is also coupled to the I/O interface 245 that provides the electronic device 200 with the ability to connect to other devices, such as client devices 106-114. The I/O interface 245 is the communication path between these accessories and the processor 240.

The processor 240 is also coupled to the input 250 and the display 255. The operator of the electronic device 200 can use the input 250 to enter data or inputs into the electronic device 200. The input 250 can be a keyboard, touchscreen, mouse, track ball, voice input, or other device capable of acting as a user interface to allow a user in interact with the electronic device 200. For example, the input 250 can include voice recognition processing, thereby allowing a user to input a voice command. In another example, the input 250 can include a touch panel, a (digital) pen sensor, a key, or an ultrasonic input device. The touch panel can recognize, for example, a touch input in at least one scheme, such as a capacitive scheme, a pressure sensitive scheme, an infrared scheme, or an ultrasonic scheme. The input 250 can be associated with the sensor(s) 265, the radar transceiver 270, a camera, and the like, which provide additional inputs to the processor 240. The input 250 can also include a control circuit. In the capacitive scheme, the input 250 can recognize touch or proximity.

The display 255 can be a liquid crystal display (LCD), light-emitting diode (LED) display, organic LED (OLED), active matrix OLED (AMOLED), or other display capable of rendering text and/or graphics, such as from websites, videos, games, images, and the like. The display 255 can be a singular display screen or multiple display screens capable of creating a stereoscopic display. In certain embodiments, the display 255 is a heads-up display (HUD).

The memory 260 is coupled to the processor 240. Part of the memory 260 could include a RAM, and another part of the memory 260 could include a Flash memory or other ROM. The memory 260 can include persistent storage (not shown) that represents any structure(s) capable of storing and facilitating retrieval of information (such as data, program code, and/or other suitable information). The memory 260 can contain one or more components or devices supporting longer-term storage of data, such as a read only memory, hard drive, Flash memory, or optical disc.

The electronic device 200 further includes one or more sensors 265 that can meter a physical quantity or detect an activation state of the electronic device 200 and convert metered or detected information into an electrical signal. For example, the sensor 265 can include one or more buttons for touch input, a camera, a gesture sensor, optical sensors, cameras, one or more inertial measurement units (IMUs), such as a gyroscope or gyro sensor, and an accelerometer. The sensor 265 can also include an air pressure sensor, a magnetic sensor or magnetometer, a grip sensor, a proximity sensor, an ambient light sensor, a bio-physical sensor, a temperature/humidity sensor, an illumination sensor, an Ultraviolet (UV) sensor, an Electromyography (EMG) sensor, an Electroencephalogram (EEG) sensor, an Electrocardiogram (ECG) sensor, an IR sensor, an ultrasound sensor, an iris sensor, a fingerprint sensor, a color sensor (such as a Red Green Blue (RGB) sensor), and the like. The sensor 265 can further include control circuits for controlling any of the sensors included therein. Any of these sensor(s) 265 may be located within the electronic device 200 or within a secondary device operably connected to the electronic device 200.

In this embodiment, one of the one or more transceivers in the transceiver 210 is a radar transceiver 270 that is configured to transmit and receive signals for detecting and ranging purposes. The radar transceiver 270 can transmit and receive signals for measuring range and speed of an object that is external to the electronic device 200. The radar transceiver 270 can also transmit and receive signals for measuring the angle a detected object relative to the electronic device 200. For example, the radar transceiver 270 can transmit one or more signals that when reflected off of a moving object and received by the radar transceiver 270 can be used for determining the range (distance between the object and the electronic device 200), the speed of the object, the angle (angle between the object and the electronic device 200), or any combination thereof.

Figure 3A:
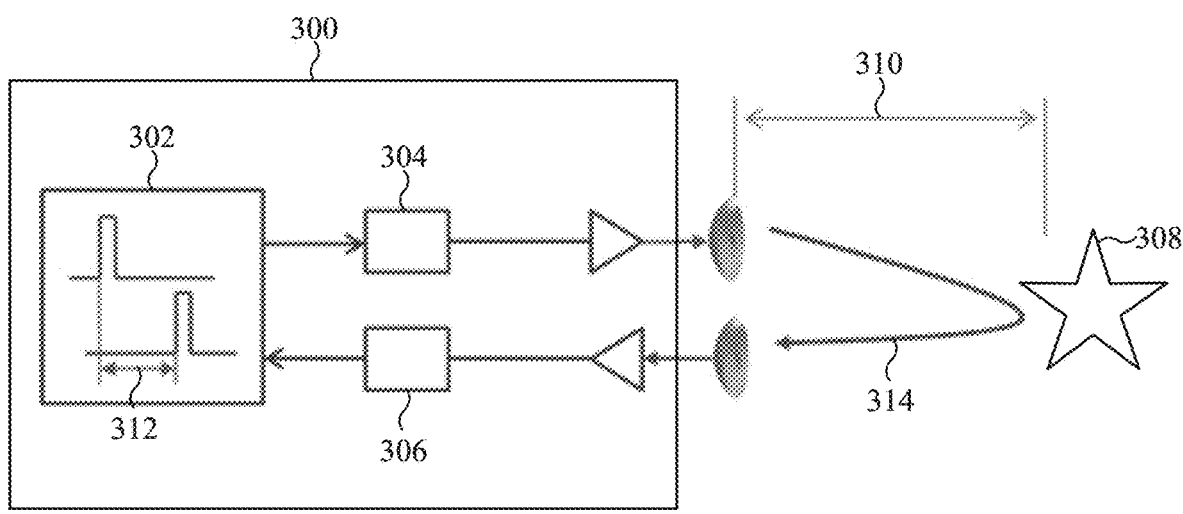
FIG. 3A illustrates an example architecture of a monostatic radar signal according to embodiments of this disclosure.

The radar transceiver 270 may be any type of transceiver including, but not limited to a radar transceiver. The radar transceiver 270 can includes a radar sensor. The radar transceiver 270 can receive the signals, which were originally transmitted from the radar transceiver 270, after the signals have bounced or reflected off of target objects in the surrounding environment of the electronic device 200. In certain embodiments, the radar transceiver 270 is a monostatic radar as the transmitter of the radar signal and the receiver, for the delayed echo, are positioned at the same or similar location. For example, the transmitter and the receiver can use the same antenna or nearly-co-located while using separate, but adjacent antennas. Monostatic radars are assumed coherent, such as when the transmitter and receiver are synchronized via a common time reference. FIG. 3A illustrates an example monostatic radar.

Although FIG. 2 illustrates one example of electronic device 200, various changes can be made to FIG. 2. For example, various components in FIG. 2 can be combined, further subdivided, or omitted and additional components can be added according to particular needs. As a particular example, the processor 240 can be divided into multiple processors, such as one or more central processing units (CPUs), one or more graphics processing units (GPUs), one or more neural networks, and the like. Also, while FIG. 2 illustrates the electronic device 200 configured as a mobile telephone, tablet, or smartphone, the electronic device 200 can be configured to operate as other types of mobile or stationary devices.

Figure 3B:
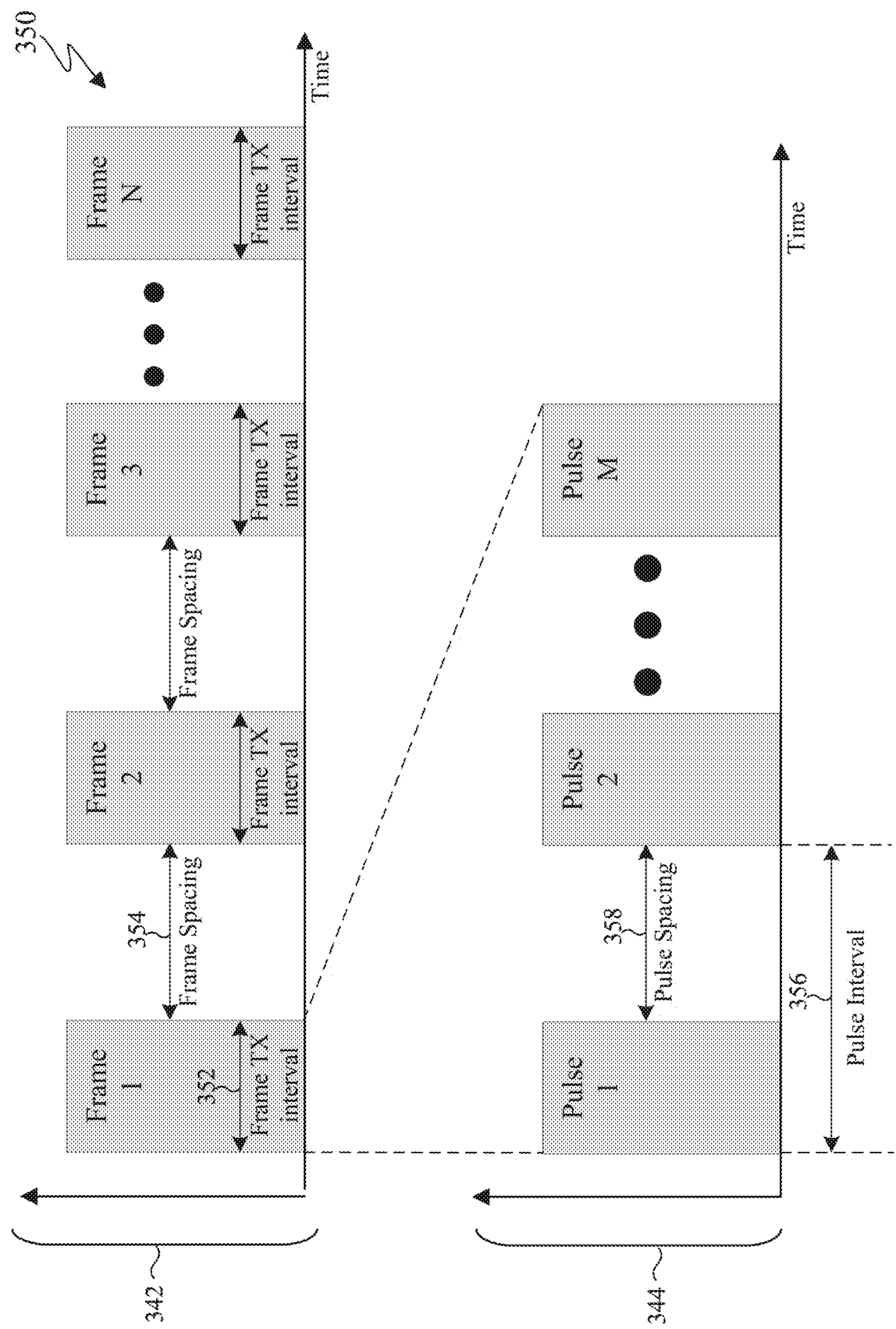
FIG. 3B illustrates an example frame structure according to embodiments of this disclosure.
Figure 3C:
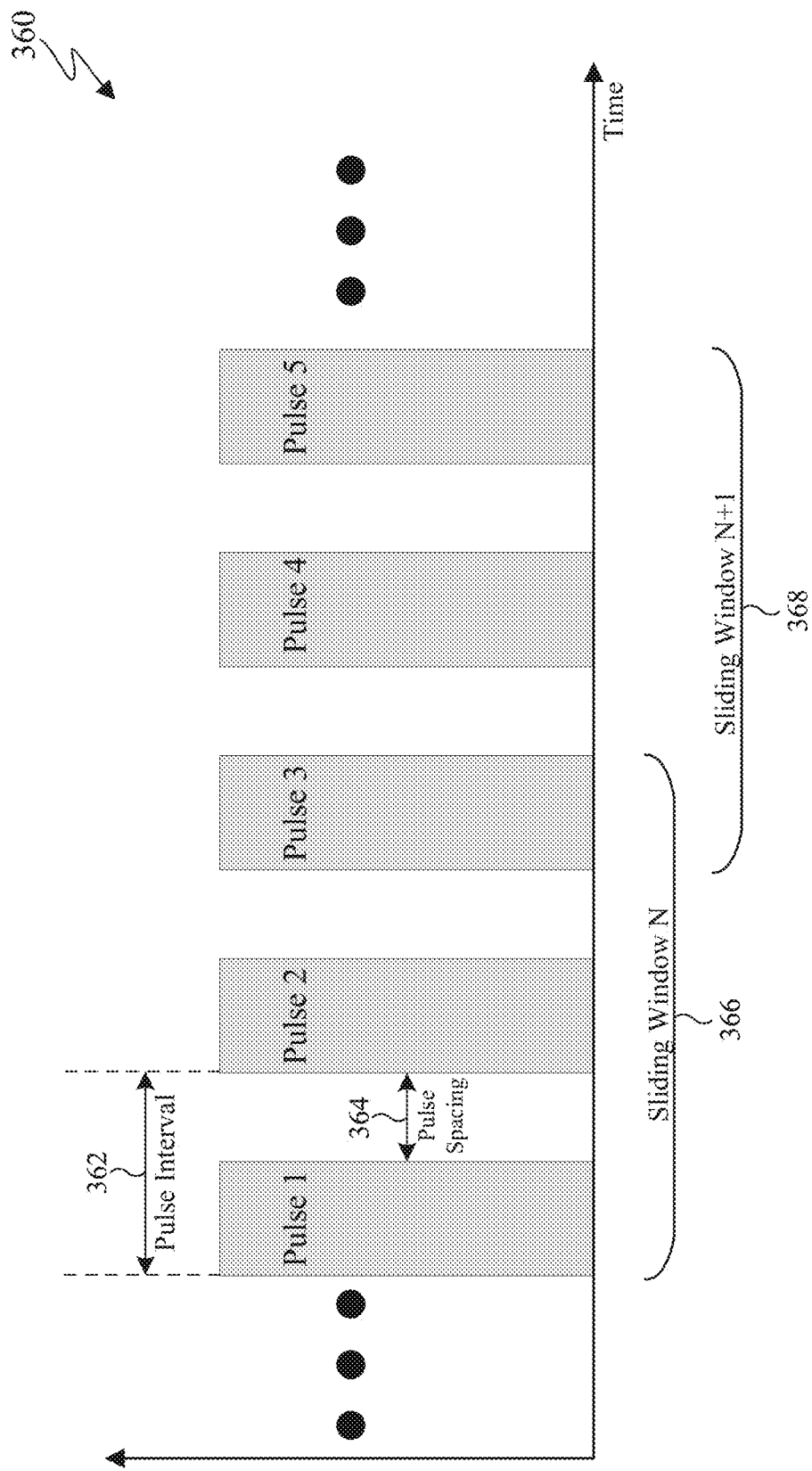
FIGS. 3C and 3D illustrate example pulse structures according to embodiments of this disclosure.
Figure 3D:
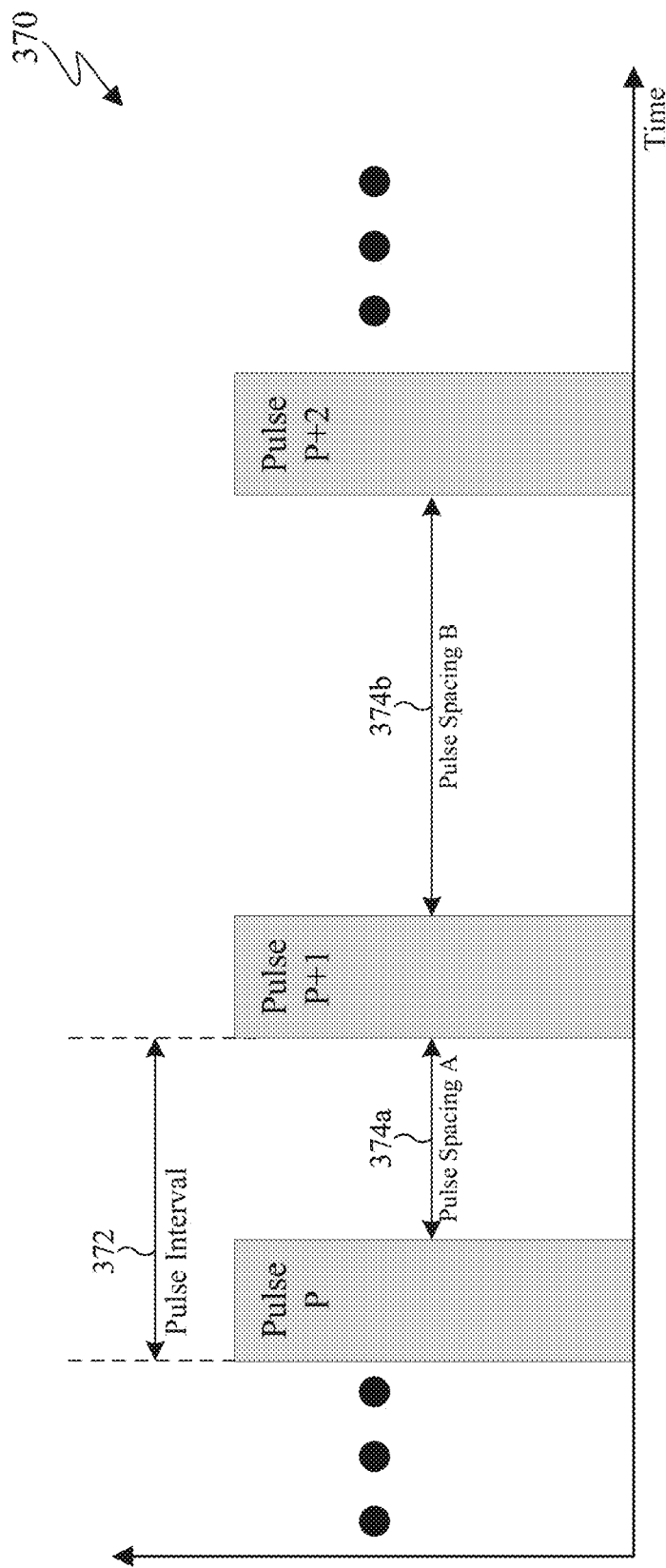

FIG. 3A illustrates an example architecture of a monostatic radar signal according to embodiments of this disclosure. FIG. 3B illustrates an example frame structure 350 according to embodiments of this disclosure. FIGS. 3C and 3D illustrate example pulse structures 360 and 370, respectively, according to embodiments of this disclosure. The embodiments of FIGS. 3A-3D are for illustration only and other embodiments can be used without departing from the scope of the present disclosure.

FIG. 3A illustrates an electronic device 300 that includes a processor 302, a transmitter 304, and a receiver 306. The electronic device 300 can be similar to any of the client devices 106-114 of FIG. 1, the server 104 of FIG. 1, or the electronic device 200 of FIG. 2. The processor 302 is similar to the processor 240 of FIG. 2. Additionally, the transmitter 304 and the receiver 306 can be included within the radar transceiver 270 of FIG. 2.

The transmitter 304 of the electronic device 300 transmits a signal 314 to the target object 308. The target object 308 is located a distance 310 from the electronic device 300. For example, the transmitter 304 transmits a signal 314 via an antenna. In certain embodiments, the target object 308 correspond to an external object (such as a human body part or a protective case of the electronic device 300). The signal 314 is reflected off of the target object 308 and received by the receiver 306, via an antenna. The signal 314 represents one or many signals that can be transmitted from the transmitter 304 and reflected off of the target object 308. The processor 302 can identify the information associated with the target object 308, such as the speed the target object 308 is moving and the distance the target object 308 is from the electronic device 300, based on the receiver 306 receiving the multiple reflections of the signals, over a period of time.

Leakage (not shown) represents radar signals that are transmitted from the antenna associated with transmitter 304 and are directly received by the antenna associated with the receiver 306 without being reflected off of the target object 308.

In order to track the target object 308, the processor 302 analyzes a time difference 312 from when the signal 314 is transmitted by the transmitter 304 and received by the receiver 306. It is noted that the time difference 312 is also referred to as a delay, as it indicates a delay between the transmitter 304 transmitting the signal 314 and the receiver 306 receiving the signal after the signal is reflected or bounced off of the target object 308. Based on the time difference 312, the processor 302 derives the distance 310 between the electronic device 300, and the target object 308. Additionally, based on multiple time differences 312 and changes in the distance 310, the processor 302 derives the speed that the target object 308 is moving.

Monostatic radar is characterized for its delayed echo as the transmitter 304 of the radar signal and the receiver 306 of the radar signal essentially are at the same location. In certain embodiments, the transmitter 304 and the receiver 306 are co-located either by using a common antenna or nearly co-located but use separate but adjacent antennas. Monostatic radars are assumed coherent such that the transmitter 304 and the receiver 306 are synchronized via a common time reference.

A radar pulse is generated as a realization of a desired radar waveform, modulated onto a radio carrier frequency, and transmitted through a power amplifier and antenna, such as a parabolic antenna. In certain embodiments, the pulse radar is omnidirectional. In other embodiments, the pulse radar is focused into a particular direction. When the target object 308 is within the field of view of the transmitted signal and within a distance 310 from the radar location, then the target object 308 will be illuminated by RF power density (W/m²), $p_t$, for the duration of the transmission. Equation (1) describes the first order of the power density, $p_t$.

$$p_t = \frac{P_T}{4\pi R^2} G_T = \frac{P_T}{4\pi R^2} \frac{A_T}{(\lambda^2/4\pi)} = P_T \frac{A_T}{\lambda^2 R^2} \qquad (1)$$

Referring to Equation (1), $P_T$ is the transmit power (W). $G_T$ describes the transmit antenna gain (dBi) and $A_T$ is an effective aperture area (m²). $\lambda$ corresponds to the wavelength of the radar signal (m), and R corresponds to the distance 310 between the antenna and the target object 308. In certain embodiments, effects of atmospheric attenuation, multi-path propagation, antenna loss and the like are negligible, and therefore not addressed in Equation (1).

The transmit power density impinging onto the target object 308 surface can cause reflections depending on the material, composition, surface shape and dielectric behavior at the frequency of the radar signal. In certain embodiments, only direct reflections contribute to a detectable receive signal since off-direction scattered signals can be too weak to be received by at the radar receiver. The illuminated areas of the target with normal vectors pointing back at the receiver can act as transmit antenna apertures with directives (gains) in accordance with their effective aperture areas. Equation (2), below, describes the reflective back power.

$$P_{refl} = p_t A_t G_t \sim p_t A_t r_t \frac{A_t}{\lambda^2/4\pi} = p_t RSC \quad (2)$$

In Equation (2), $P_{refl}$ describes the effective isotropic target-reflected power (W). The term, $A_t$, describes the effective target area normal to the radar direction ($m^2$). The term $r_t$ describes the reflectivity of the material and shape, which can range from $[0, \ldots, 1]$. The term $G_t$ describes the corresponding aperture gain (dBi). RSC is the radar cross section ($m^2$) and is an equivalent area that scales proportional to the actual reflecting area-squared inversely proportional with the wavelength-squared and is reduced by various shape factors and the reflectivity of the material itself. Due to the material and shape dependency, it is difficult to deduce the actual physical area of a target from the reflected power, even if the distance 310 to the target object 308 is known.

The target reflected power at the receiver location results from the reflected power density at the reverse distance 310 collected over the receiver antenna aperture area. Equation (3), below, describes the received target reflected power. It is noted that PR is the received target reflected power (W) and $A_R$ is the receiver antenna effective aperture area ($m^2$). In certain embodiments, $A_R$ is the same as $A_t$.

$$P_R = \frac{P_{refl}}{4\pi R^2} A_R = P_T \cdot RSC \frac{A_T A_R}{4\pi \lambda^2 R^4} \quad (3)$$

A radar system can be used as long as the receiver signal exhibits sufficient signal-to-noise ratio (SNR). The value of SNR depends on the waveform and detection method. Equation (4), below, describes the SNR. It is noted that kT is the Boltzmann constant multiplied by the current temperature. B is the radar signal bandwidth (Hz). F is the receiver noise factor which is a degradation of the receive signal SNR due to noise contributions of the receiver circuit itself.

$$SNR = \frac{P_R}{kT \cdot B \cdot F} \quad (4)$$

When the radar signal is a short pulse of duration or width, $T_p$, the delay or time difference 312 between the transmission and reception of the corresponding echo is described in Equation (5). $\tau$ corresponds to the delay between the transmission and reception of the corresponding echo and equal to Equation (5). c is the speed of light propagation in the air. When there are multiple targets at different distances, individual echoes can be distinguished only if the delays differ by at least one pulse width. As such, the range resolution of the radar is described in Equation (6). A rectangular pulse of a duration $T_P$ exhibits a power spectral density as described in Equation (7) and includes a first null at its bandwidth as shown in Equation (8). The range resolution of a radar signal is connected with the bandwidth of the radar waveform is expressed in Equation (9).

$$\tau = 2R/c \quad (5)$$

$$\Delta R = c\Delta \tau/2 = cT_P/2 \quad (6)$$

$$P(f) \sim (\sin(\pi f T_P)/(\pi f T_P))^2 \quad (7)$$

$$B = 1/T_P \quad (8)$$

$$\Delta R = c/2B \quad (9)$$

Depending on the radar type, various forms of radar signals exist. One example is a Channel Impulse Response (CIR). CIR measures the reflected signals (echoes) from potential objects as a function of distance at the receive antenna module, such as the radar transceiver 270 of FIG. 2. In certain embodiments, CIR measurements are collected from transmitter and receiver antenna configurations which when combined can produce a multidimensional image of the surrounding environment. The different dimensions can include the azimuth, elevation, range, and Doppler.

The speed resolution (such as the Doppler resolution) of the radar signal is proportional to the radar frame duration. Radar speed resolution is described in Equation (10), below.

$$\Delta v = \frac{\lambda}{2T_{tx-frame}} \quad (10)$$

Here, $\lambda$ is the wavelength of the operating frequency of the radar, and $T_{tx-frame}$ is the duration of active transmission (simply called the radar frame duration here) of the pulses in the radar frame.

The example frame structure 350 of FIG. 3B illustrates an example raw radar measurement. The example frame structure 350 includes multiple frames such as frame 1, frame 2, frame 3, through frame N. The frame structure 350 describes that time is divided into frames 342, where each frame has an active transmission period (denoted as a transmission interval 352) and a silence period (denoted as a frame spacing interval 354). During a transmission interval 352, M pulses 344 may be transmitted. The frame spacing interval, such as the frame spacing interval 354 can be the same or a different time than frame spacing interval between the frame 1 and the frame 2.

Each frame, such as the frame 1 can have one or more pulse, such as pulse 1, pulse 2 through pulse M. When a frame has more than two pulses, the pulses are separated by a pulse spacing 358. The pulse spacing interval, such as the pulse spacing 358 can be the same or a different time than pulse spacing interval between the pulse 1 and the pulse 2. A pulse interval such as a pulse interval 356, is the time of transmission of one pulse and the subsequent pulse space. For example, the pulse interval 356 is the transmission interval of pulse 1 and the pulse spacing 358.

In certain embodiments, different transmit and receive antenna configurations activate for each pulse or each frame. In certain embodiments, different transmit or receive antenna configurations activate for each pulse or each frame. It is noted that although the example frame structure 350 illustrates only one frame type, multiple frame types can be defined in the same frame, where each frame type includes a different antenna configuration. Multiple pulses can be used to boost the SNR of the object or may use different antenna configurations for spatial processing.

In certain embodiments, each pulse or frame may have a different transmit/receive antenna configuration corresponding to the active set of antenna elements and corresponding beamforming weights. For example, each of the M pulses in a frame can have different transmit and receive antenna pair allowing for a spatial scan of the environment (such as using beamforming), and each of the frames 342 all repeat the same pulses.

The example frame structure 350 illustrates uniform spacing between pulses and frames. In certain embodiments, any spacing, even non-uniform spacing, between pulses and frames can be used.

Long radar frames can be used to generate reliable detection of an object even when there is only minor and weak movement, since there is a higher chance that movement will occur during a long frame. To minimize the cost of using long radar frames, embodiments of the present disclosure describe processing multiple radar frames together to increase the radar observation time while keeping the same or similar effective radar transmission cycle.

In certain embodiments, the transmission interval 352 of a frame is shorter than the frame spacing interval 354. For example, the transmission interval 352 of a frame can be 0.2 seconds for each of the frames (such as frame N) and the frame spacing interval 354 can be 0.8 seconds. In this example, when processing two consecutive frames the effective radar frame increases to 1.2 seconds (the duration of two of the frames which have a transmission interval of 0.2 seconds each, and the frame spacing interval of 0.8 seconds), while the actual radar transmission remains the same. Similarly, when processing three consecutive frames the effective radar frame increases to 2.2 seconds (the duration of three of the frames which have a transmission interval of 0.2 seconds each, and two frame spacings intervals which are 0.8 seconds each), while the actual radar transmission remains the same.

When the frame spacing is different than the pulse spacing is denoted as a first radar timing structure. FIG. 3C, describes a second radar timing structure which occurs when the frame spacing is the same as the pulse spacing.

The pulse structure 360 of FIG. 3C illustrates a special case of a frame structure. The pulse structure 360 illustrates the frame spacing as being the same as the pulse spacing 364. As illustrated, the pulse interval 362 represents the time duration of a pulse and a subsequent pulse spacings (such as the pulse 1 and the pulse spacing 364). In this embodiment, there is no actual physical boundaries between the frames. This timing structure allows sliding window processing where the stride (how often to do the processing) could be selected accordingly. An illustrative example for sliding window 366 and 368 of three pulses with a stride of two is shown in FIG. 3C. This frame structure is denoted as the second radar timing structure below.

Using variable spacing between pulses and/or frames can increase flexibility and provide coexistence with other systems. For example, consider a 5G system setting, the radar may be constrained by the 5G scheduler on when the radar could operate. By allowing variable spacing, the radar can transmit whenever allowed or not impacting the 5G scheduled time. For another example, consider a WiFi-like system that implements a carrier sensing-based solution. In such a case, the availability of the medium is unknown a priori. The transmitter would have to first listen for transmission in the medium before it can transmit. This kind of uncertainty makes it difficult to guarantee uniform sampling of the pulses and/or frames.

In contrast to the pulse structure 360, the pulse structure 370 of FIG. 3D illustrates an example where the pulse spacing is not uniform. For example, Pulse P and Pulse P+1 are separated by a pulse spacing 374a while the Pulse P+1 and Pulse P+2 are separated by a pulse spacing 374b. As illustrated, pulse spacing 374a is shorter than the pulse spacing 374b. When the time duration of the pulse spacings vary, the pulse interval also vary, such as the pulse interval 372. For example, as illustrated the pulse interval 372 represents the time duration of a pulse and a subsequent pulse spacings (such as the pulse 1 and the pulse spacing 374a), while another pulse interval would represent the pulse P+1 and the pulse spacing 374b.

Although FIGS. 3A-3D illustrate electronic device 300 and radar signals, various changes can be made to FIGS. 3A-3D. For example, different antenna configurations can be activated, different frame timing structures can be used or the like. FIGS. 3A-3D do not limit this disclosure to any particular radar system or apparatus.

FIG. 4A illustrates a diagram 400 of an electronic device 402 with a FoV corresponding to beams according to embodiments of this disclosure. FIG. 4B illustrates a diagram 420 of an electronic device 402 with multiple field of view regions corresponding to beams according to embodiments of this disclosure. FIG. 4C illustrates a diagram 430 of an electronic device 402 being held according to embodiments of this disclosure. FIG. 4D illustrates a diagram 440 of an electronic device 402 with a phone case that is detected using radar signals according to embodiments of this disclosure. The embodiments of the diagrams 400, 420, 430, and 440, are for illustration only. Other embodiments can be used without departing from the scope of the present disclosure.

The diagram 400, 420, 430, and 440, as shown in FIGS. 4A-4B illustrates an electronic device 402. The electronic device 402 can be similar to any of the client devices 106-114 of FIG. 1, the server 104 of FIG. 1, or the electronic device 300 of FIG. 3A and include internal components similar to the electronic device 200 of FIG. 2.

As illustrated in FIG. 4A, the electronic device 402 includes three transceivers 410a, 410b and 410c (collectively transceivers 410). Any of the transceivers 410 can include mmWave antenna modules or panels and be similar to the transceiver 210 of FIG. 2.

Each of the three transceivers 410a, 410b and 410c include a communication module with collocated radar. In other embodiments (not shown) the communication module is not collocated with radar. Additionally, as illustrated the electronic device 402 can have three separate radar FoV regions with each FoV region corresponding to one of the transceivers 410.

In certain embodiments, the electronic device 402 can determine whether one or more objects are within a FoV region 412. In other embodiments, a remote server, such as the server 104 in FIG. 1 receives information from the electronic device 402 and determines whether one or more objects are within a FoV region 412. The determination of whether an object is within a FoV region 412 is based on the size and shape of the FoV region. It is noted that the size and shape of the FoV region is based on the capabilities of the radar as well as environmental factors at the location of the electronic device 402.

The edge of the radar FoV is defined by a boundary. A boresight is the center of the FoV region 412. The boresight can be the axis of maximum gain (such as maximum radiated power) of an antenna (e.g., a directional antenna) of the electronic device 402. In some instances, the axis of maximum gain coincides with the axis of symmetry of the antenna of the electronic device 402. For example, for axial-fed dish antennas, the antenna boresight is the axis of symmetry of the parabolic dish, and the antenna radiation pattern (the main lobe) is symmetrical about the boresight axis. Most boresight axes are fixed by their shape and cannot be changed. However, in certain implementations, the electronic device 402 includes one or more phased array antennas that can electronically steer a beam, change the angle of the boresight by shifting the relative phase of the radio waves emitted by different antenna elements, radiate beams in multiple directions, and the like. The FoV region 412 of the electronic device 402 is the range of angles around the boresight, within which an object can be detected.

As illustrated in FIG. 4B, the electronic device 402 can include one or more mmWave antenna modules or panels. As illustrated, the electronic device 402 includes two mmWave antenna modules or panels, one located on the right side (corresponding to FoV regions 425a, 425b, and 425c) while the other is located on the left side (corresponding to FoV regions 425d, 425e, and 425f). Other electronic devices can include less or more mmWave antenna modules or panels, such as a single mmWave antenna module or panel. The electronic device 402 can transmit multiple beams corresponding to various regions such as the FoV regions 425a, 425b, 425c, 425d, 425e, and 425f (collectively FoV regions 425). Each beam has a width and a direction. A FoV of a particular region is based on the width and direction of that region.

In certain embodiments, such as described below with respect to FIG. 12, the electronic device can detect whether one or more of the regions are blocked by an object. Upon determining which region is blocked, the electronic device 402 can modify a wireless communication operation associated with transceiver (such as the mmWave antenna module).

The diagram 430 of FIG. 4C and the diagram 440 of FIG. 4D illustrate examples of the transceiver being blocked by an object, such as a hand a user (as shown in FIG. 4C) or by a case (as shown in FIG. 4D) for protecting the electronic device case.

FIG. 4C illustrates the diagram 430 of the electronic device 402 being held by a hand 404 of a user. As illustrated, one or more of the transceivers are blocked by the hand 404. As such, based on the embodiments described below, the electronic device can determine that one or more of the transvers is fully blocked and modify a wireless communication operation associated with the transceiver.

FIG. 4D illustrates the diagram 440 of the electronic device 402 within a protective case 406. The electronic device 402 includes a transmitter 442a, a receiver 442b, and internal component(s) 444. The transmitter 442a can be similar to the transmitter 304 of FIG. 3A and included within the radar transceiver 270 of FIG. 2. Similarly, the receiver 442b can be similar to the receiver 306 of FIG. 3A and included within the radar transceiver 270 of FIG. 2.

As illustrated in FIG. 4D, the transmitter 442a transmits various signals which are received by the receiver 442b. For example, the transmitter 442a transmits the signal 452 which reflects off of the internal components 444 and eventually received by the receiver 442b. For another example, the transmitter 442a transmits the signal 454 which is directly received by the receiver 442b. For another example, the transmitter 442a transmits the signal 456 which reflects off of the part of the electronic device 402 and eventually received by the receiver 442b. For yet another example, the transmitter 442a transmits the signal 458 which reflects off of the protective case 406 and eventually received by the receiver 442b.

The signal 454 can create an artifact in a range-amplitude RA map. the artifact is an example of self-interference due to the direct and short link distance between the radar TX and radar RX that can be considered collocated for monostatic radars. Due to the short distance, this self-interference is often very strong and close range objects cannot be detected reliably if this signal is not canceled. The direct TX-RX link along with those other unwanted reflections near the radar is denoted as leakage.

Embodiments of the present disclosure describe various approaches for leakage cancellation. One approach is to maintain premeasured and saved leakage measurement. In this example, depending on the stability of the hardware and expected changes in the device (e.g., whether it is likely the user may attach or change accessories to the device), measurement of the leakage could be done at the manufacturing stage and saved to device memory. If some slow change is expected, occasional updates to the saved leakage could be done. With saved leakage measurements, to cancel the leakage, the saved leakage is subtracted from the raw radar signal (could be processed to some format). It is noted that signals at this stage of the radar processing are often complex numbers. The subtraction could be a simple subtraction, or some weighted subtraction to minimize the minimum mean square error (MMSE). For instance, if the objective is to minimize the MMSE on a per antenna basis, the weights are described in Equations (11) and (12).

$$y_{a,can} = y_a - w_{MMSE} y_{a,ref} \qquad (11)$$

$$w_{MMSE} = \frac{y_{a,ref}^H y_a}{\|y_{a,ref}\|^2}, \qquad (12)$$

Here, $y_a$ is the complex impulse response (CoIR) of the radar measurement for antenna a (which is a one-dimensional (1D) vector of dimension equal to the number of range taps), $y_{a,ref}$ is the CoIR of the saved leakage measurement, $y_{a,can}$ is the CoIR after the leakage cancellation, $(\cdot)^H$ is the conjugate transpose operation. Once this leakage cancellation state is identified, the electronic device can then identify the amplitude of the resulting signal to obtain RAM.

Another approach for leakage cancellation may use the Doppler processing. This approach does not rely on having premeasured leakage measurements. However, this approach does allow for hardware and/or accessory changes. It is noted that this approach may unsuccessfully detect static objects. Since a human body part cannot be completely static and often has some micro-movement, 0-Doppler nulling approach is applicable for detecting human body part such as the hand. The idea of the approach is based on the observation that the leakage signal does not change over time (e.g., relative TX-RX position is fixed and so are the other components so that those reflections are constant over time). Based on this observation, the leakage signals can be cancelled by nulling out the 0-Doppler component of the radar measurements. Depending on the stability of the radar implementation, it could be beneficial to null out up to ±k Doppler bins, where k is some natural number such as 0, 1, 2, etc. It is noted that for the special case of 0-Doppler nulling, there is no need to perform any Fourier transformation, since it is equivalent to subtracting out the average, and this simple operation helps reduce the complexity of the processing. This procedure is illustrated in the block diagram in FIG. 5.

Although FIGS. 4A-4D illustrate electronic device 402 in various situations, various changes can be made to FIGS. 4A-4D. For example, any number of antennas can be used to create any number of regions, as shown in FIG. 4B. For another example, more or less transceivers can be located at various locations of the electronic device 402. FIGS. 4A-4D do not limit this disclosure to any particular radar system or apparatus.

Figure 5:
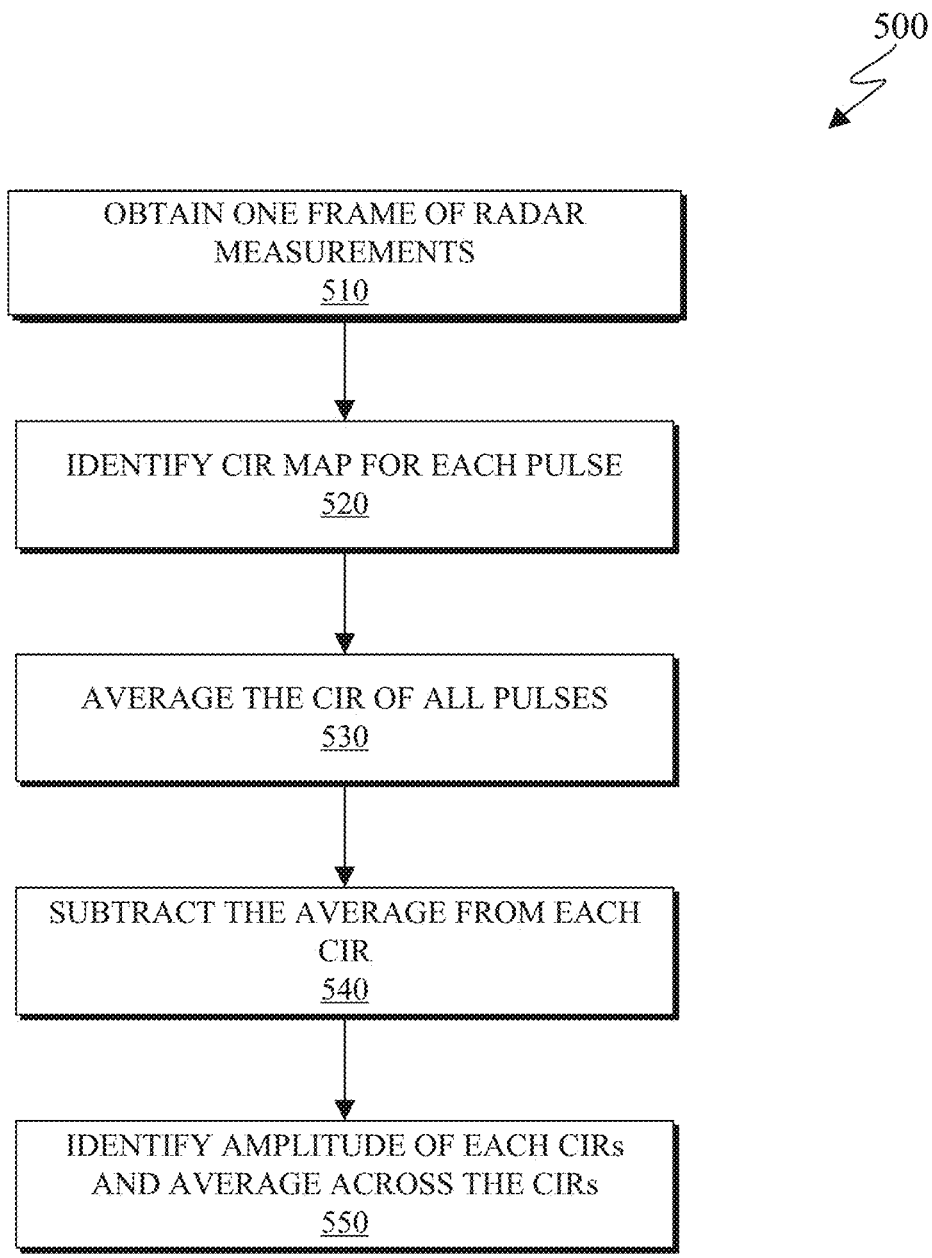
FIG. 5 illustrates a method for object detection according to embodiments of this disclosure; for object detection.

FIG. 5 illustrates a method 500 for object detection according to embodiments of this disclosure.

The method 500 is described as implemented by any one of the client device 106-114 of FIG. 1, the server 104 of FIG. 1, the electronic device 300 of FIG. 3A, the electronic device 402 of FIGS. 4A-4D, and can include internal components similar to that of electronic device 200 of FIG. 2. However, the method 500 as shown in FIG. 5 could be used with any other suitable electronic device and in any suitable system, such as when performed by the electronic device 200. For ease of explanation, FIG. 5 is described as being performed by the electronic device 200 of FIG. 2. The embodiments of the method 500 of FIG. 5 is for illustration only. Other embodiments can be used without departing from the scope of the present disclosure.

The method 500 can apply to both single frame and multi-frame radar processing for object detection. Using a 0-Doppler nulling approach, as described in the method 500, to cancel the leakage, a range-amplitude (RA) map (such as one of the RA maps as shown in FIGS. 5A and 5B) can be generated.

In step 510, the electronic device 200 obtains measurements from one radar frame. In step 520, the electronic device 200 processes the radar frame to identify the CIR. For example, the raw radar measurements are processed (pulse-compression or taking fast-Fourier transform (FFT) for Frequency Modulated Continuous Wave (FMCW) radar) to compute the CIR also known as range FFT for FMCW radar, for each pulse in the frame.

In step 530, the electronic device 200 averages the CIRs from all the pulses within the radar frame to generate the zero-frequency (DC) component as measured by the current processed radar frame. The DC component is the estimate of the reflection from all static objects within the radar's FoV. These static reflections include the leakage (the direct transmission from the radar TX to the radar RX and other reflections off the parts of the radar equipped device) as well as other static objects (relative to the radar) not part of the device housing the radar. In step 540, the electronic device 200 removes (subtracts) the DC component from each pulse.

In step 550, the electronic device 200 identifies the amplitude and averages the pulses to generate the RA map of the radar frame. The resulting output is called the range profile, which provides a measure of the amplitude of non-static objects within the radar's FoV for each range tap. The RA map is a one dimensional signal that captures the amplitude of the reflected power from the reflectors in the FoV of the radar for a finite set of discrete range values (denoted as range tap or tap).

This same processing as described in the method 500 can be applied to both single and multi-frame case. It is noted that a difference between the single frame and the multi-frame case is the number of pulses (which also implies differences in the total radar frame duration). Note that with longer frame duration, the radar can detect an object with slow movement such as the blocking hand (e.g., when holding the device with the radar) that could only have little movement. By using longer frame duration (e.g., by combining two radar frames), even with such objects with little movement, it is likely that there is some movement within the longer frame, which will be captured by some radar pulses in the frame. This helps prevent 0-Doppler nulling from cancelling out the contribution from objects with minor movement (though not static such as the blocking hand). FIGS. 8A-10 describe processes for determining whether to use a single frame or multi-frame for full-blockage detection.

As described above, body parts of a live human can be expected to possess some movements at all times. The movement can be typical body movement (such as intentional hand movement such as grabbing or reaching for something or some unintentional ones such as micro movement caused by the muscle reflexes, and the like). Some of the micro movements could be difficult to see visually because of the minor and weak nature of those movements. For radar the sensitivity of the detection of such movement depends on the observation time of the radar signals (which is the radar frame duration in our case). For example, the longer the frame duration is the more sensitive the radar is to the minor movement. Accordingly, the objects being detected as described in FIG. 5 are non-static objects in order to detect a body part of a human to avoid exposing the body part to RF exposure above a certain threshold.

Although FIG. 5 illustrates one example for detecting an object various changes may be made to FIG. 5. For example, while shown as a series of steps, various steps in FIG. 5 could overlap, occur in parallel, or occur any number of times.

Figure 6A:
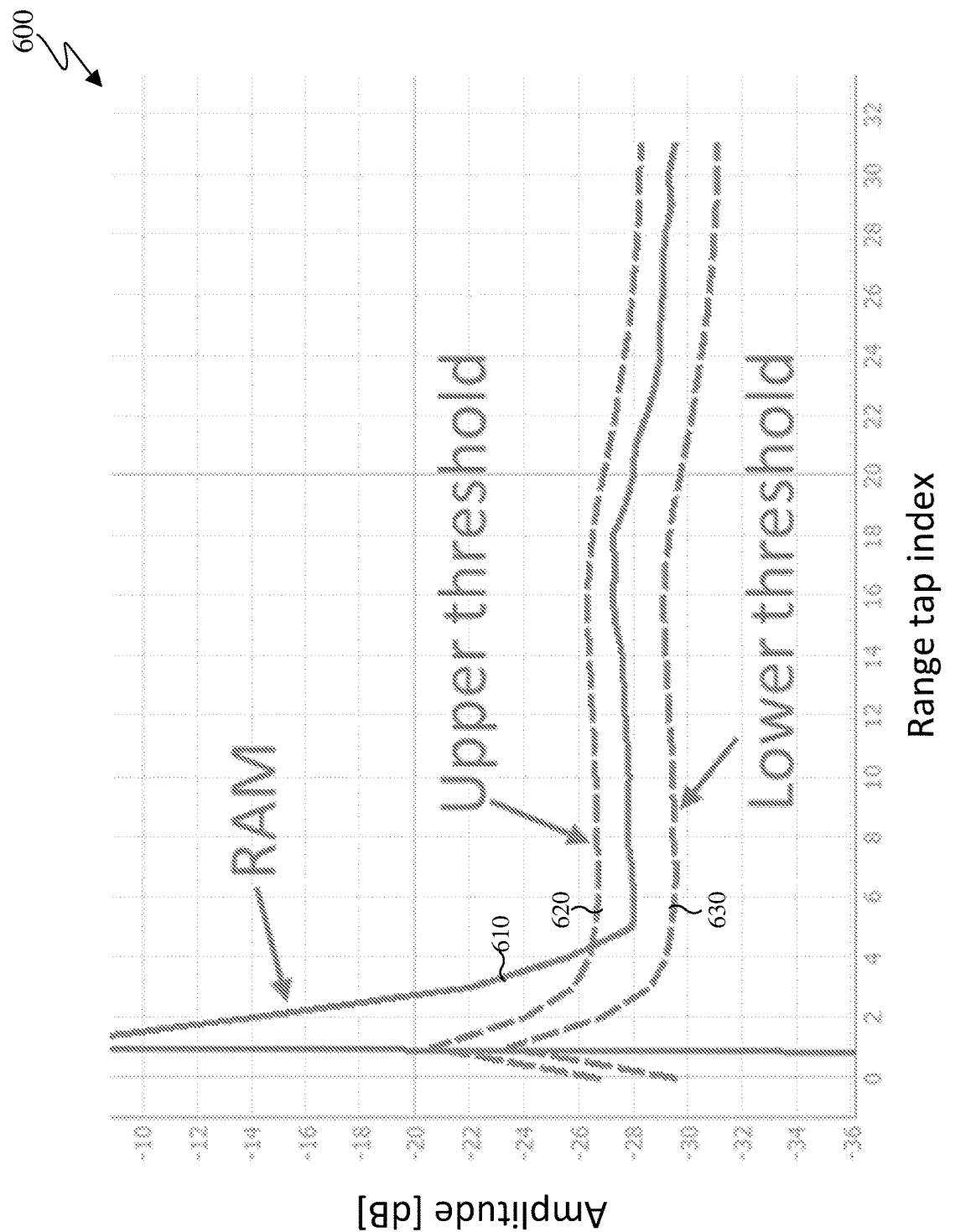
FIGS. 6A and 6B illustrate example graphs depicted a range-amplitude mapping of received signals according to embodiments of this disclosure.
Figure 6B:
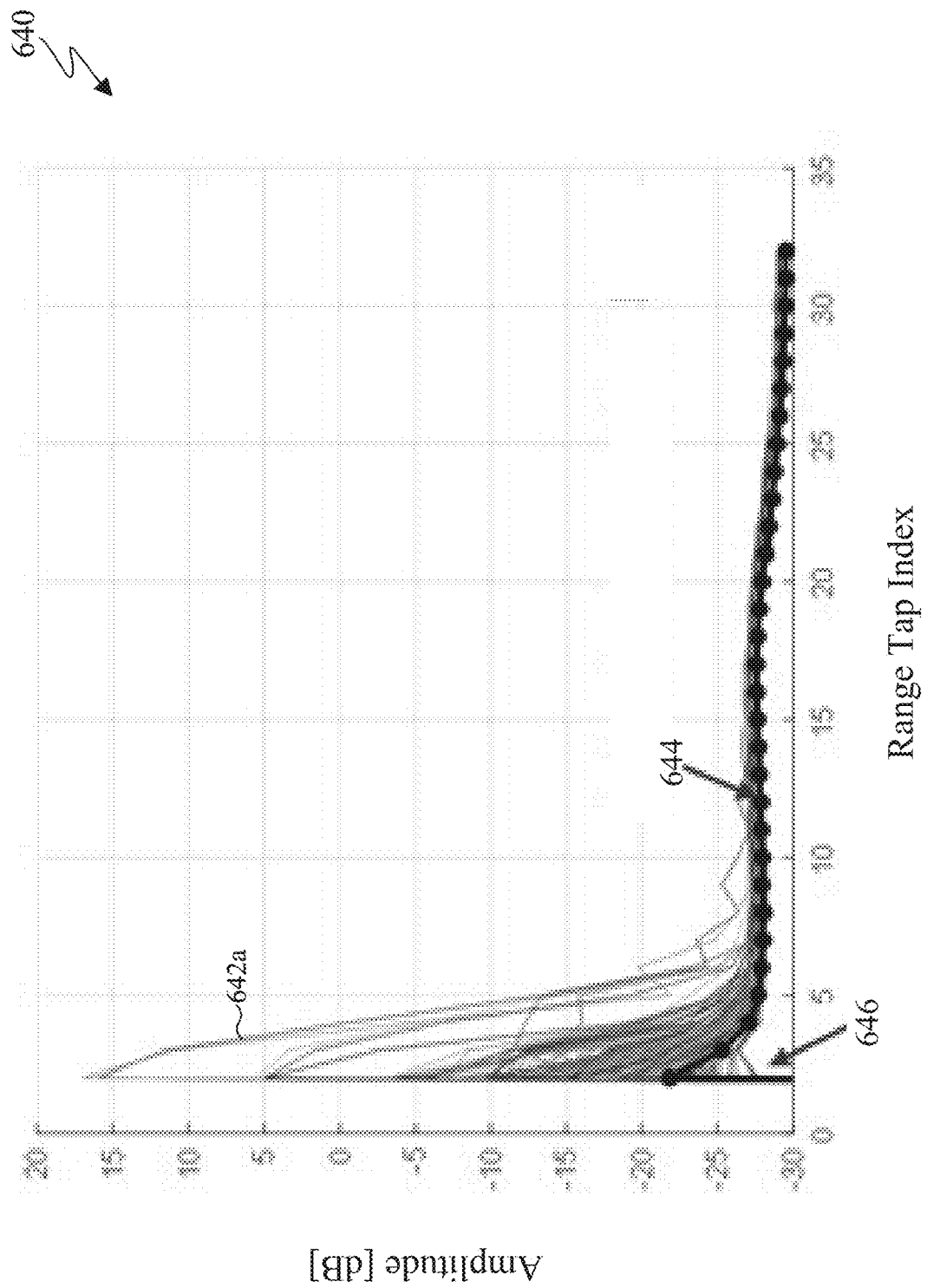

FIGS. 6A and 6B illustrate example graphs 600 and 640, respectively, depicting a range-amplitude mapping of received signals according to embodiments of this disclosure. The embodiments of FIGS. 6A and 6B are for illustration only and other embodiments can be used without departing from the scope of the present disclosure.

Embodiments of the present disclosure take into consideration that direct full-blockage detection is difficult due to various factors such as size restrictions of the transceiver to fit in mobile devices. Full-blockage detection is based on a situation where an object blocks the entire FoV of the communication interface.

A full-blockage (also denoted as blockage) event (or scenario) occurs when an object blocks the entire FoV of the radar sensor. As described above, a direct detection of such a full-blockage situation is by determining for each direction that the radar can detect an object (i.e., blocked). However, such an approach uses a high angular resolution, which requires a large antenna array size that may not fit into the electronic device. Also, even if angular resolution allows, such a detection would require scanning all angular directions using a large quantity of the resources available to the electronic device (such as battery power, time to operate radar, and the like).

Figure 7A:
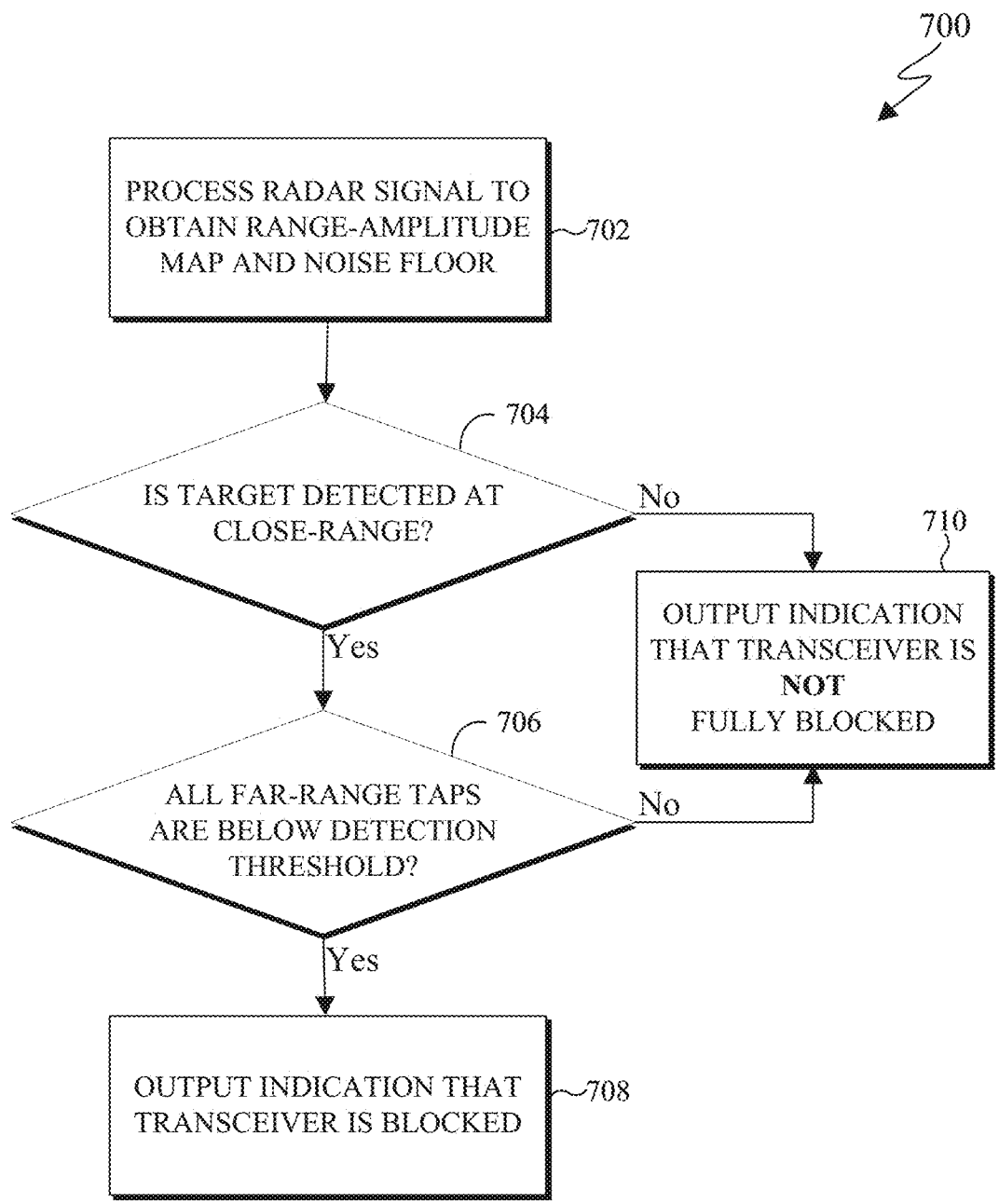
FIGS. 7A and 7B illustrate example methods for determining whether a transceiver of the electronic device is blocked according to embodiments of this disclosure.
Figure 7B:
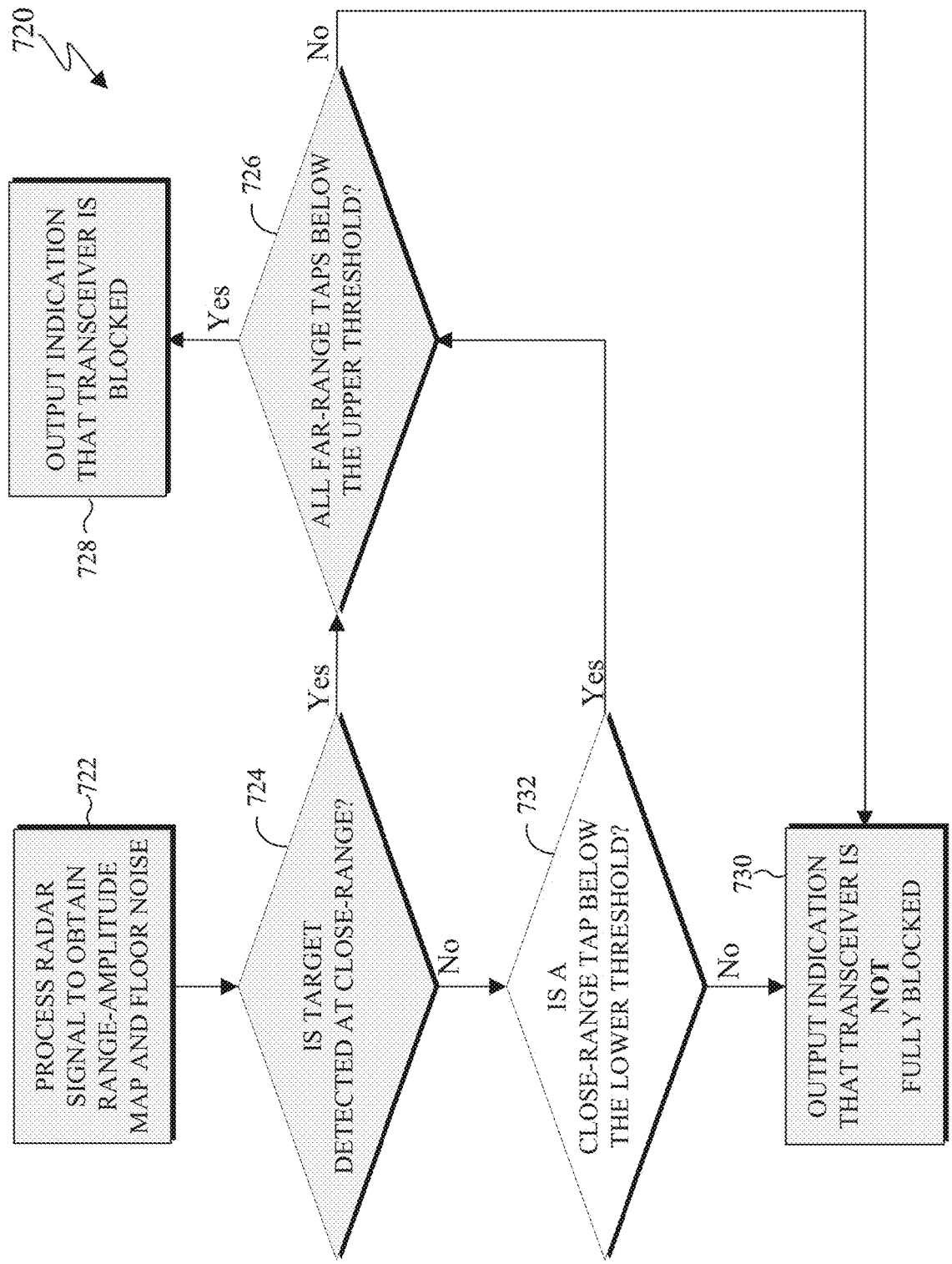

In certain embodiments, an electronic device can detect a full blockage scenario using indirect methods. For example, the electronic device 200 can detect a full-blockage scenario based on two criteria. For the first criterion, the electronic device 200 determines that an object is at close range to the transceiver. For the second criterion, the electronic device 200 determines that no object is detected beyond the object detected in the first criterion. For instance, if the electronic device detects an object at a close distance (satisfying the first criterion) and detects an object at a far distance (not satisfying the second criterion), indicates that at least some portion of the FoV of the radar is not blocked. However, if no objects are detected at a distance further than the detected object can indicate that the radar transceiver is fully blocked. FIGS. 7A and 7B describe methods that use these criteria for determining whether the communication interface is fully blocked.

The graph 600 of FIG. 6A illustrates example measurement of a full-blockage case along with an upper threshold 620 and a lower threshold 630. The RA map 610 is a 1D mapping of the radar return signal strength as a function of the range (distance). One way to detect objects is to search for peaks in the RA map with significant amplitude. A peak is identified when the amplitude of the RA map 610 is above some detection threshold, denoted as the upper thresholds 620. For instance, the detection threshold could be set to 3 dB above a noise floor. In certain embodiments, the noise floor is estimated. In other embodiments, the noise floor is saved and can be updated periodically since the noise floor could be expected to be relatively static and does not change too fast with time. In those implementations, the noise floor estimation step could be done only when needed.

The graph 640 of FIG. 6B illustrates multiple RA map measurements of a full blockage scenario. Each line, such as line 642a represents one measurement of the full blockage scenario. The line 644 represents the noise/residual level. The arrow 646 indicates RA map measurements that are below the noise/residual level, as indicated by the line 644. As illustrated, certain measurements around tap 2 (as indicated by the arrow 646) the residual can be significantly reduced, and it can fall to the noise-floor level similar to that of far range. The electronic device 200 can determine whether the communication interface is blocked based in part on whether measurements are detected below the residual at a close range. This example is described in FIG. 7B.

Although FIGS. 6A and 6B illustrates example RA maps various changes may be made to FIGS. 6A and 6B. For example, the thresholds of FIG. 6A can be adjusted. Additionally the shape of the RA maps can vary based object locations relative to the radar and environmental factors.

FIGS. 7A and 7B illustrate example methods 700 and 720, respectively, for determining whether a transceiver of the electronic device is blocked according to embodiments of this disclosure. In particular, the method 700 as illustrated in FIG. 7A illustrates one example for determining whether a transceiver of the electronic device is blocked according to embodiments of this disclosure. Similarly, the method 720 as illustrated in FIG. 7B illustrates another example for determining whether a transceiver of the electronic device is blocked according to embodiments of this disclosure.

The embodiments of the method 700 of FIG. 7A and the method 720 of FIG. 7B are for illustration only. Other embodiments can be used without departing from the scope of the present disclosure.

As illustrated in method 700 of FIG. 7A, in step 702, an electronic device (such as the electronic device 200) obtains radar signals. The radar signals are processed to generate the RA map measurement, such as the graph 600 of FIG. 6A. The RA map measurement is a 1D mapping of the radar return signal strength as a function of the range (distance). One way to detect objects is to search for peaks in the RA map with significant amplitude. For example, an object can be detected when the RA map is above some detection threshold, denoted as the upper threshold 620 of FIG. 6A. For instance, the detection threshold could be set to 3 dB above the noise floor.

Once the RA map and the noise floor are identified (based on the method 500 of FIG. 5 and shown in the graph 600 of FIG. 6A), the electronic device in step 704, determines whether an object is detected at a close-range (distance). In certain embodiments, close range, corresponds to a predefined physical distance from the electronic device. For example, the distance can be within 10 centimeter (cm) from the radar. For another example, the distance can be within 5 cm from the radar. It is noted that other distances can be used in this disclosure. The physical distance can then be translated to the number of range bins or taps in accordance with the radar range resolution.

For example, in an implementation with a radar range resolution of 3 cm, and the desired close-range of 5 cm, then an object is detected at close-range is represented as a peak at tap 1 or 2 (tap 1 is assumed to correspond to 3 cm and tap 2 to 6 cm range) that is larger than the upper threshold 620 as shown in FIG. 6A. The upper threshold 620 is typically used to avoid detecting noise and it is usually set to some offset value above the noise floor (such as 3 dB from the noise floor as noted earlier). The upper threshold 620 as well as the noise floor could be dependent on the range tap, in which case, they are a function of the range tap index instead of just a single scalar number.

If there is no object at the close-range is detected (as determined in step 704), then the electronic device 200 in step 710 outputs an indication that the transceiver is not fully blocked.

Alternatively, if an object is detected at the close range (as determined in step 704), then the electronic device 200 in step 706 determines whether an object is detected at the far-range taps. Far-range taps could be defined as any tap index larger than some threshold $T_0$. Referring back to the example of radar with a range resolution of 3 cm, $T_0$ may be selected as being within the range between 6 and 10 cm or any other distance larger than the defined close range distance.

In certain embodiments, some range taps near the close-range object are ignored because of the bandwidth limitation of the filter for the radar. For example, the peak may have energy leaking from the peak and those taps near the close-range peak could have significant signal strength that is larger than the upper threshold 620 as shown in the example plot below.

If there is at least one far-range tap above the upper threshold 620 (indicating that an object is detected at a far range (distance) from the electronic device), as determined in step 706, the electronic device 200 in step 710 would output an indication that the transceiver is not fully blocked.

Alternatively, if an all far-range taps are below the upper threshold 620 (indicating that no objects are detected at the far range (distance) from the electronic device), as determined in step 706 (and illustrated in FIG. 6A), then the electronic device 200 in step 708 declares that a full-blockage is detected. For example, the electronic device can generate an output indicating that the transceiver is blocked. The electronic device can then modify an operation of the communication system based on the indication that the transceiver is blocked.

For the case when 0-Doppler nulling is used, the method 700 as described in FIG. 7A can be augmented with additional conditions as shown in FIG. 7B. In certain hand blockage situation, the resulting RA map (after the 0-Doppler nulling) could have close range taps with significantly lower amplitude than in typical cases where there is no object at the close range taps, such as illustrated in the FIG. 6B. It is noted that due to minor instability of the hardware, the leakage signal may have some small fluctuation over time. This fluctuation while very small, could produce significant residual after the 0-Doppler nulling because the leakage signal is often very strong. However, in certain hand blockage cases, the RA mapping after 0-Doppler nulling is significantly lower than the typical residual observed in those close range taps. One possible explanation for this behavior is that the blocker might have blocked some of the leakage signal so that the residual from the oscillation itself has been reduced. The method 720 of FIG. 7B exploits this observation as another clue for the full-blockage detection.

It is noted that in a case when a close-range object is detected, the same procedure is followed as described in the embodiment of FIG. 7A. That is, the method 720 of FIG. 7B modifies the method 700 of FIG. 7A by adding the step 732. For example, the step 702 of FIG. 7A corresponds to the step 722 of FIG. 7B. The step 704 of FIG. 7A corresponds to the step 724 of FIG. 7B. The step 706 of FIG. 7A corresponds to the step 726 of FIG. 7B. The step 708 of FIG. 7A corresponds to the step 728 of FIG. 7B. The step 710 of FIG. 7A corresponds to the step 730 of FIG. 7B.

If no close-range object is detected (as determined in step 724), the electronic device in step 732 compares the close range taps against a lower threshold, such as the lower threshold 630 of FIG. 6A. The lower threshold can be selected as an offset value below the typical noise floor/residual level. In certain embodiments, the lower threshold may use the same offset used to compute the upper threshold (such as the upper threshold 620 in FIG. 6A). That is, the lower threshold could be set to 3 dB below the noise floor while the upper threshold could be set to 3 dB above the noise floor.

In another approach, measurements similar to the graph 640 of FIG. 6B could be conducted. For example, the electronic device 200 can identify the statistics of the amplitude at each tap comparing with the noise floor when there is no object. The electronic device 200 can then select the lower threshold such that it detects full-blockage well while it does not detect the no-object case (i.e., balancing detection rate and false-alarm). In certain embodiments, a 90% detection rate with under 5% false-alarm rate could be used when selecting the lower threshold.

If there are one or more close range taps falling below the lower threshold (as determined in step 732), then the electronic device 200 in step 726 determines whether all far range taps are below the upper threshold. That is, if there are one or more close range taps falling below the lower threshold (as determined in step 732), then the electronic device 200 proceeds in the same way as when a close range object is detected (as described above in FIG. 7A).

In certain embodiments, when there is a close-range tap below the lower threshold (as determined in step 732), the electronic device 200 may declare full blockage right away (step 728) by skipping step 726. This process may depend on the way noise floor is estimated.

In certain embodiments, the noise floor is estimated for each measurement and in some cases the noise floor estimate can be impacted by a strong object. In such a case, the estimated noise floor could be significantly biased in the positive direction making it more prone to setting the lower threshold too high. To avoid such vulnerability, the electronic device in step 726 determines whether all far-range taps are below the detection threshold.

If there are no close range taps falling below the lower threshold (as determined in step 732), then the electronic device 200 in step 730 outputs an indication that the transceiver is not fully blocked.

Although FIGS. 7A and 7B illustrates various examples for detecting a blockage scenario various changes may be made to FIGS. 7A and 7B. For example, while shown as a series of steps, various steps in FIGS. 7A and 7B could overlap, occur in parallel, or occur any number of times.

It is noted that FIGS. 7A and 7B describe detecting full-blockage using only the current radar frame (i.e., single-radar frame). However, detection performance can be improved by processing multiple radar frames in a sliding window approach. FIGS. 8A-10 describe jointly processing two or more adjacent radar frames to enhance detection accuracy (in terms of both improving the detection rate as well as reducing the false alarm rate). It is noted that the described embodiments are applicable to both cases when using premeasured leakage or 0-Doppler nulling for leakage cancellation. 0-Doppler nulling case, however, it can be expected to gain the most from this approach of jointly processing two radar frames. This is because by jointly processing two radar frames, the duration of radar pulse transmission during the processing window increases, and thus the observation time of the object is longer compared to the single-frame processing case. Fourier analysis theory indicates that longer observation time provides finer differentiation in the frequency domain (i.e., better frequency resolution), which translates to better separate of the 0-Doppler (which is unwanted) and the object (e.g., body part with weak movement). There is no clear benefit when using the leakage cancellation using leakage reference approach.

Figure 8A:
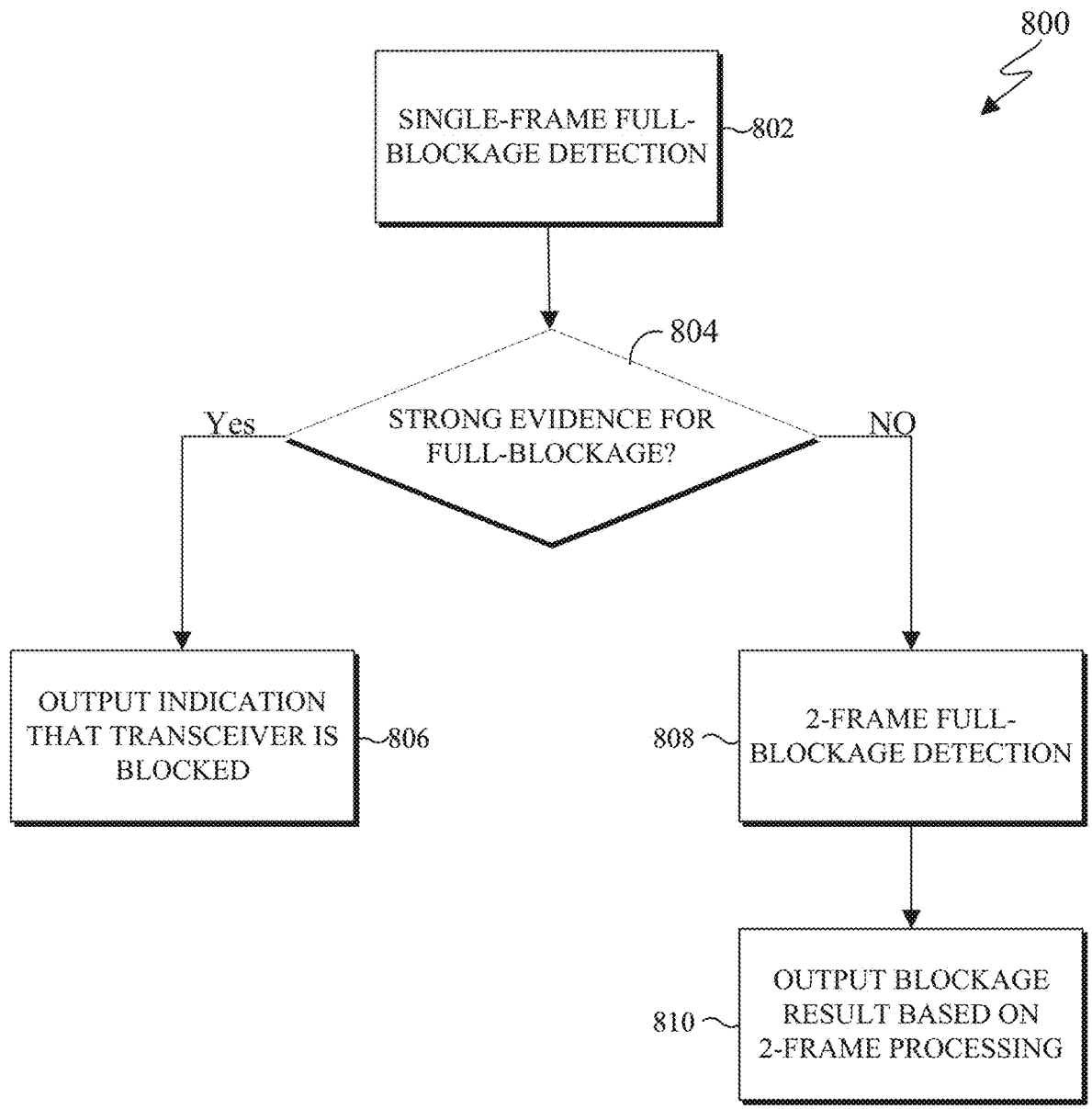
FIGS. 8A-10 illustrate example methods for determining a number of frames for blockage detection of a transceiver of the electronic device according to embodiments of this disclosure.
Figure 8B:
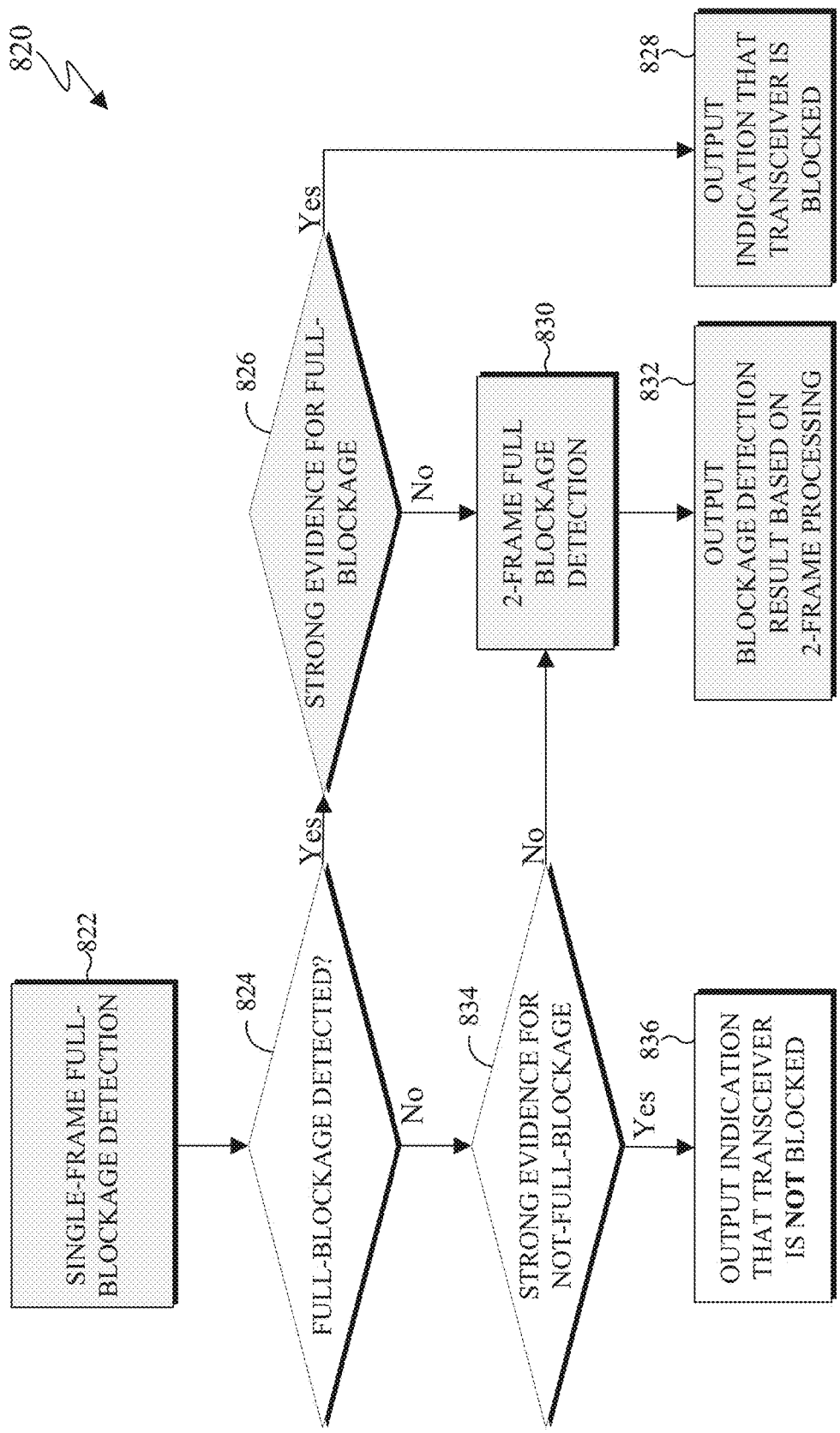
Figure 9:
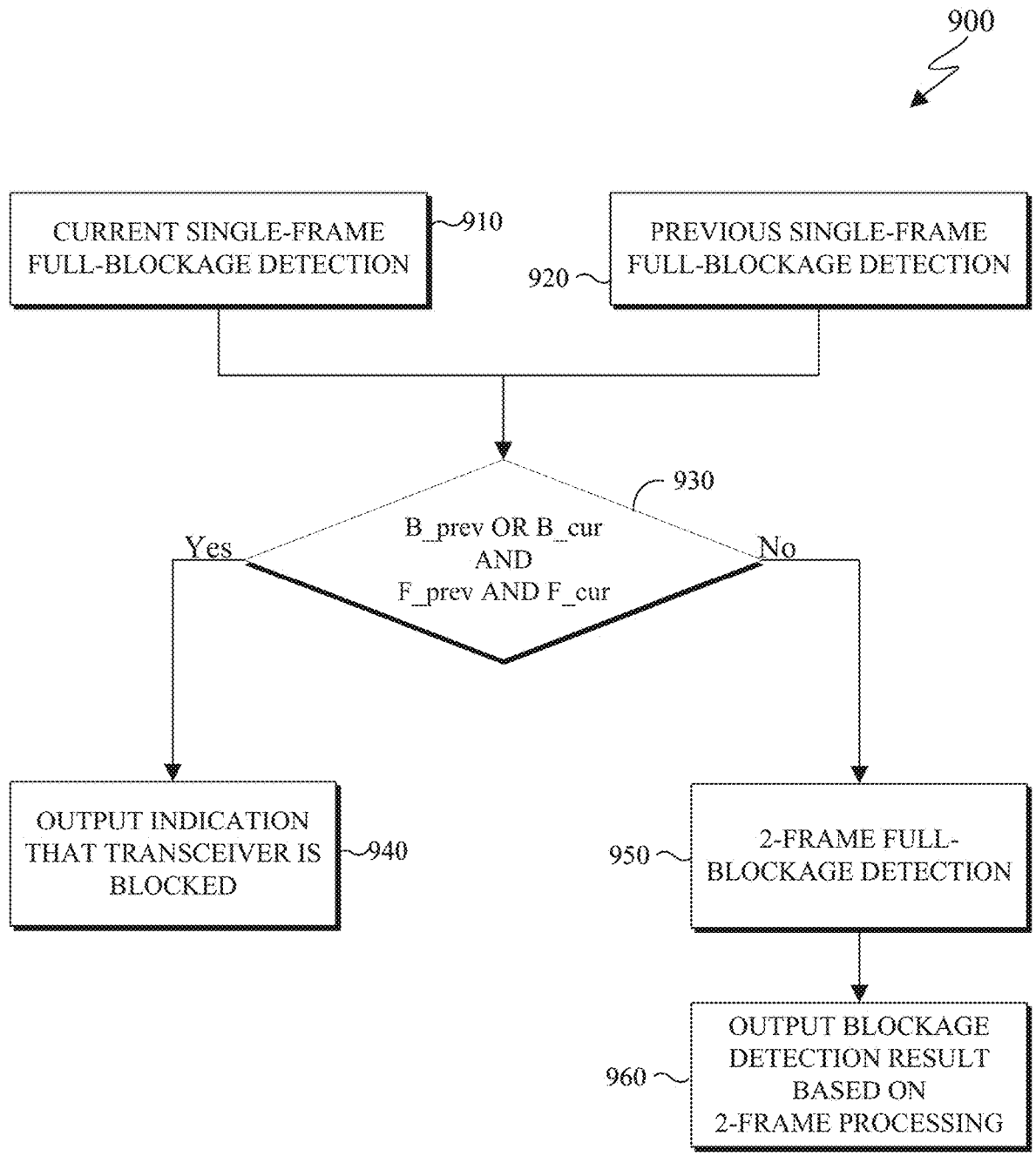
Figure 10:
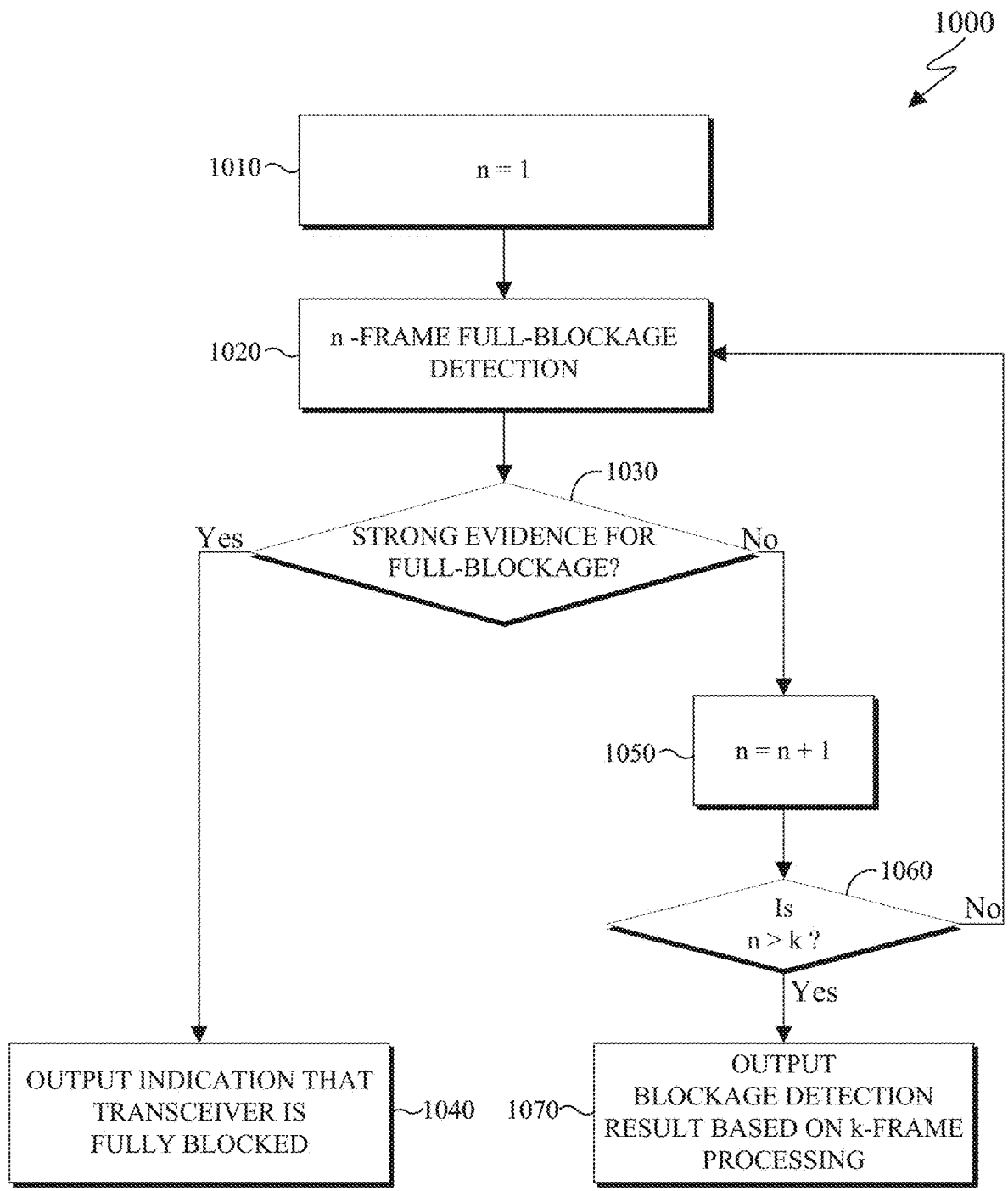

FIGS. 8A-10 illustrate example methods 800, 820, 900, and 1000, respectively, for determining a number of frames for blockage detection of a transceiver of the electronic device according to embodiments of this disclosure. In particular, FIG. 8A illustrates the example method 800 for full-blockage detection leveraging processing of up to two radar frames. FIG. 8B illustrates the example method 820 for full-blockage detection leveraging processing of up to two radar frames that detects for strong evidence for both full blockage and non-full-blockage detection with single frame. FIG. 9 illustrates the example method 900 for full-blockage detection leveraging processing of up to two radar frames, where both the current and previous single-frame are processed. It is noted that the additional information from previous single-frame processing provides additional protection by making it stricter in determining whether there was a far-range object detected. FIG. 10 illustrates the example method 1000 for full-blockage detection using up to any number of radar frames.

The method 800 as illustrated in FIG. 8A, the method 820 as illustrated in FIG. 8B, the method 900 as illustrated in FIG. 9, and the method 1000 as illustrated in FIG. 10 are described as implemented by any one of the client device 106-114 of FIG. 1, the electronic device 300 of FIG. 3A, the electronic device 402 of FIGS. 4A-4D and can include internal components similar to that of electronic device 200 of FIG. 2. However, the methods 800, 820, 900, and 1000, as shown in FIGS. 8A and 10, respectively, could be used with any other suitable electronic device and in any suitable system, such as when performed by the electronic device 200.

The method 800 as illustrated in FIG. 8A describes an example of when to process two radar frames. It is noted that the method 800 avoids unnecessary processing of two radar frames (which uses additional computational power as compared to processing a single radar frame), whenever it is deemed that the detection using the current single radar frame provide strong enough evidence for the detection.

In step 802, an electronic device (such as the electronic device 200) performs a single frame blockage detection, such as described above in FIG. 7A or 7B. For example, the electronic device 200 can determine whether the transceiver is blocked using a single radar frame.

In step 804, the electronic device 200 determines whether there is strong evidence that the transceiver is blocked. In certain embodiments, strong evidence that the transceiver is blocked using the current single-frame full-blockage detection if the electronic device 200 detects the full-blockage for the case whether there is close range tap falling below the lower threshold and whether there is no far-range tap detected below the detection threshold. For example, when (i) there is close range tap falling below the lower threshold and (ii) there is no far-range tap detected, then in step 806 the electronic device 200 determines that there is a strong evidence for full-blockage situation. When there is strong evidence for a full blockage (as determined in step 804), the electronic device in step 806 outputs an indication that the transceiver is blocked, and 2-frame processing is not conducted.

Alternatively, if the current single-frame processing detects full blockage with a different condition or the electronic device does not detect full-blockage (as determined in step 804), the electronic device 200 in step 808 processes 2-radar frames for blockage detection. In step 810, the electronic device 200 outputs a blockage detection result based on the 2-frame processing. The output result can be either "full blockage" or "not full blockage."

For example, the determination of whether to perform 2-frame processing as described in FIG. 8A is based on the detection result of the single-frame processing. If the single-frame processing detects full-blockage based on the strong evidence (based on the electronic device 200 identifying (i) that there is at least one close range tap below the lower threshold and (ii) that there is no far-range tap above the detection threshold), then the electronic device 200 determines that there is strong evidence for full-blockage. In that case, the procedure outputs full-blockage detected. If no such evidence was detected by the single-frame processing, it proceeds to 2-frame processing.

The method 820 as illustrated in FIG. 8B describes an example of when to process two radar frames for blockage detection using strong evidence for both full blockage and non-full blockage. That is, strong evidence can be detected for both when full-blockage is detected and when full blockage is not detected.

It is noted that the method 820 of FIG. 8B is similar to and modifies the method 800 as illustrated in FIG. 8A. That is, the method 820 of FIG. 8B modifies the method 800 of FIG. 8A by adding steps 824, 834 and 836. For example, the step 822 of FIG. 8B corresponds to the step 802 of FIG. 8A. The step 826 of FIG. 8B corresponds to the step 804 of FIG. 8A. The step 828 of FIG. 8B corresponds to the step 806 of FIG. 8A. The step 830 of FIG. 8B corresponds to the step 808 of FIG. 8A. Additionally, the step 832 of FIG. 8B corresponds to the step 810 of FIG. 8A.

In step 822, an electronic device (such as the electronic device 200) performs a single frame blockage detection, such as described above in FIG. 7A or 7B. In step 824, the electronic device 200 determines whether the output of the single frame detection indicates that the transceiver is blocked.

When the electronic device determines that the transceiver is blocked (as determined in step 824), then in step 826 the electronic device 200 determines whether there is strong evidence indicating that the transceiver is fully blocked. In certain embodiments, the electronic device 200 determines that there is strong evidence that the transceiver is blocked when (i) one or more close range taps are below the lower threshold (such as the lower threshold 630 of FIG. 6A) and (ii) that all far range taps are below the detection threshold (such as the upper threshold 620 of FIG. 6A).

When the electronic device 200 determines that there is strong evidence for full blockage (as determined in step 826) using a single radar frame, then the electronic device 200 in step 828 outputs an indication indicating that the transceiver is blocked. Alternatively, when the electronic device 200 determines that there is no strong evidence of full blockage (as determined in step 826) using a single radar frame, then the electronic device 200 in step 830 processes 2-radar frames for blockage detection.

When the electronic device 200 determines that the transceiver is not blocked (as determined in step 824), then in step 834, the electronic device 200 determines whether there is strong evidence indicating that the transceiver is not fully blocked. In certain embodiments, the electronic device 200 determines that there is strong evidence that the transceiver is not blocked when an object is detected at a predefined distance from the electronic device 200. The predefined distance can be considered a far distance from the electronic device 200.

When the electronic device 200 determines, using the single-frame processing, that there is strong evidence that the transceiver is not blocked (such as when there is an object detected at a far distance from the electronic device 200), then in step 836, the electronic device outputs an indication that the transceiver is not blocked, and 2-frame processing is not conducted.

When the electronic device 200 identifies, using the single-frame processing, either (i) that there is no strong evidence that the transceiver is not blocked (such as when an object is detected at a far range) as determined in step 834 or (ii) that there is no strong evidence that the transceiver is blocked (such as when the electronic device 200 identifies (1) that there is at least one close range tap below the lower threshold and (2) that there is no far-range tap above the detection threshold) as determined in step 826, then the electronic device 200 in step 830 performs full blockage detection using two frames. In step 832, the electronic device 200 outputs a blockage result based on the 2-frame processing. The output result can be either "full blockage" or "not full blockage."

The method 900 as illustrated in FIG. 9 describes an example process of an electronic device 200 using up to two radar frames for full blockage detection. As described in the method 900, both the current and previous single-frame are processed. This additional information from previous single-frame processing provides additional protection in determining whether there was a far-range object detected.

It is noted that FIG. 9 uses the following notation. The expression B_cur denotes the predicate 'one or more close range taps fall below the lower threshold' when processing the current single-frame. The expression F_cur denotes the predicate 'all far range taps are below the detection threshold' when processing the current single-frame. Similar definitions apply to B_prev and F_prev with the difference being that the previous single-frame is used instead of the current single-frame. For example, the expressions B_prev and B_cur indicate that one or more close range taps are below the lower threshold (such as the lower threshold 630 of FIG. 6A). Similarly, the expressions F_prev and F_cur indicate that all far range taps are below the upper threshold (such as the upper threshold 620 of FIG. 6A).

In step 910, an electronic device (such as the electronic device 200) performs full blockage detection using the current single frame. The full blockage detection using the current single frame can be similar to the blockage detection as described in FIG. 7A or 7B. That is, the electronic device 200 determines whether the transceiver is blocked using the current single frame.

In step 920, the electronic device 200 performs full blockage detection using the previous single frame. The full blockage detection using the previous single frame can be similar to the blockage detection as described in FIG. 7A or 7B. That is, the electronic device 200 determines whether the transceiver is blocked using the previous single frame.

In step 930, the electronic device 200 determines (i) whether B_prev or B_cur is true and (ii) whether F_prev and F_cur is true. It is noted that the condition (B_prev OR B_cur) AND (F_prev AND F_cur) of step 930 is a more stringent condition than the one used in the embodiment described in FIG. 8B. For example, the condition of step 930 indicates that no far-range object is detected in both the current and previous single-frame.

If the electronic device 200 determines that both conditions of step 930 are satisfied then the electronic device 200 in step 940 outputs an indication that the transceiver is blocked. Alternatively, if the electronic device 200 determines that only one or neither of the conditions of step 930 are satisfied then the electronic device 200 in step 950 performs blockage detection using two-frames. In step 960, the electronic device 200 outputs a blockage result based on the 2-frame processing. The output result can be either "full blockage" or "not full blockage."

It is noted that the method 900 provides an extra level of protection such as when F_cur is true due to weak movement (when the movement of the object is not detected by the single frame). Therefore, by checking both F_cur and F_prev, provides an extra layer of confidence to the decision of whether the transceiver is blocked. For example, the condition of step 930 provides an extra protection compared to just using F_cur since a scenario could occur that the current single-frame might miss detect the far-range object that could be weak. By observing F_prev, can increase the confidence level, such as when there is no far range object and can increase the detection accuracy.

The method 800 of FIG. 8A, the method 820 of FIG. 820, and the method 900 of FIG. 9 describe processes for using a single frame or two-frame processing for determining whether the transceiver of the electronic device 200 is blocked. However, in certain embodiments, the method 800 of FIG. 8A, the method 820 of FIG. 820, and the method 900 of FIG. 9 can be augmented to allow up to k-frame processing. This is described in method 1000 as illustrated in FIG. 10. For example, the method 1000 generalizes the full-blockage detection using up to any number of radar frames.

In step 1010, an electric device (such as the electronic device 200) sets the variable 'n' to the value of one. By setting 'n' to one indicates that the electronic device performs current single frame processing for full blockage detection. The electronic device 200 can then perform the full-blockage detection.

In step 1020, the electronic device 200 performs n-frame blockage detection. Initially, since 'n' is set to the value of one (in step 1010), the electronic device 200 can perform blockage detection using the single current frame. In certain embodiments, the electronic device 200 can perform the blockage detection using method 800 of FIG. 8A where n can increase from one up to the predefined value of 'k'.

In step 1030, the electronic device 200 determines whether there is strong evidence indicating that the transceiver is fully blocked. This can be similar to the method 800 of FIG. 8A. For example, strong evidence that the transceiver is fully blocked using the current single-frame full-blockage detection if the electronic device 200 detects the full-blockage for the case whether there is close range tap falling below the lower threshold and whether there is no far-range tap detected below the detection threshold.

When a strong full-blockage is detected at any n, then method 1000 breaks the loop. That is, in step 1040, the electronic device 200 outputs an indication that full-blockage is detected and no further processing with a larger n is performed.

Alternatively, if no strong evidence of detection is detected, the electronic device 200 in step 1050 increases the value of 'n' by one. In step 1060, the electronic device 200 compares the value of 'n' (as updated in step 1050) to the value of k, where k is a predefined integer. When the electronic device 200 determines that the value of 'n' is less than the predefined value of 'k,' then the electronic device 200 return to step 1020 and performs full blockage detection using a number of n-frames, where n is modified in step 1050.

Alternatively, when the electronic device 200 in step 1070 determines that the value of 'n' is the same as or greater than the predefined value of 'k,' then the electronic device 200 outputs a blockage result based on k-frame full-blockage detection. The output result can be either "full blockage" or "not full blockage."

It is noted that if no strong evidence of full-blockage is detected in step 1030 the method 1000 continues up to n=k, and the detection results when using k-frame processing could be output as the detection result. Note that by using longer frames (i.e., larger k), the radar detection becomes more sensitive to weak and/or slow movement and the accuracy of the detection improves. However, increasing the sensitivity and accuracy (by using more frames) comes at the cost of longer delay in the detection (due to the longer frame duration) and the extra complexity needed for the detection. Therefore, the predefined value of k is often selected to balance the detection accuracy with the delay and complexity affordable for the targeted application. Similar extension can be applied to similar embodiments described in FIG. 8B when the electronic device 200 also determines whether there is strong evidence for non-full-blockage detection.

Although FIGS. 8A-10 illustrate example methods, various changes may be made to FIGS. 8A-10. For example, while the method 800, the method 820, the method 900, and the method 1000 are shown as a series of steps, various steps could overlap, occur in parallel, occur in a different order, or occur multiple times. In another example, steps may be omitted or replaced by other steps.

Figure 11A:
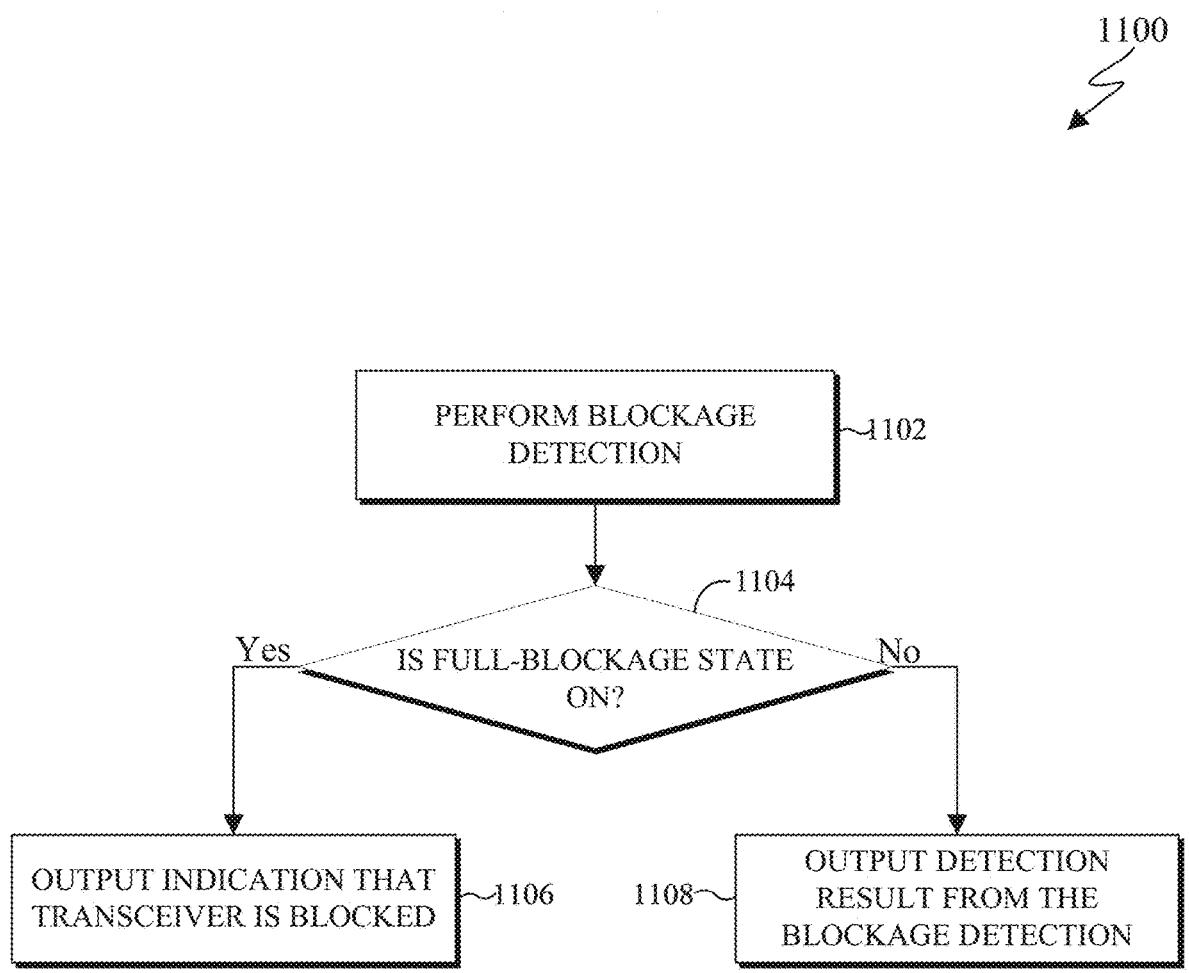
FIG. 11A illustrates an example method for using a blockage state for blockage detection of a transceiver of the electronic device according to embodiments of this disclosure.
Figure 11B:
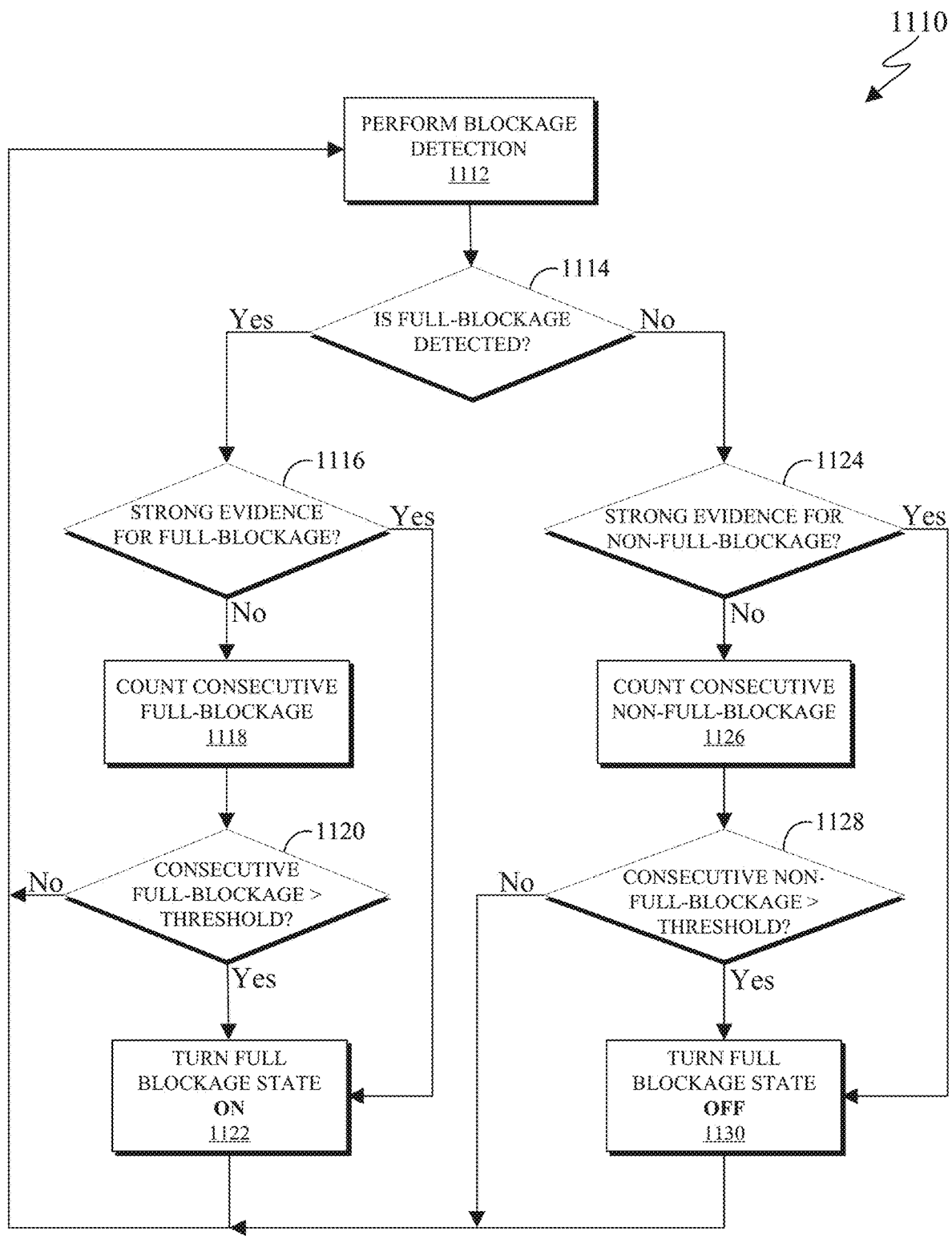
FIG. 11B illustrates an example method for activating or deactivating the blockage state according to embodiments of this disclosure.

FIG. 11A illustrates an example method 1100 for using a blockage state for blockage detection of a transceiver of the electronic device according to embodiments of this disclosure. FIG. 11B illustrates an example method 1110 for activating or deactivating the blockage state according to embodiments of this disclosure.

The method 1100 and the method 1110 are described as implemented by any one of the client device 106-114 of FIG. 1, the electronic device 300 of FIG. 3A, the electronic device 402 of FIGS. 4A-4D and can include internal components similar to that of electronic device 200 of FIG. 2. However, the methods 1100 and 1110 as shown in FIGS. 11A and 11B, respectively, could be used with any other suitable electronic device and in any suitable system, such as when performed by the electronic device 200.

When a user is holding an electronic device (such as the electronic device 200) and blocks the transceiver, it is likely that the hand of the user stays in that position for a period of time before the user moves or starts using the device, which may change the full-blockage status. Therefore embodiments of the present disclosure take into consideration that it is unlikely that the full-blockage status would oscillate between full-blockage and not-full-blockage over a short period of time (e.g., within one or a few radar frames or a few seconds).

In certain embodiments, when using the multi-frame processing for the detection, sliding windows can be used such that some of the pulses were also used in previous detection are used in the current frame, which provides some temporal correlation.

In certain embodiments, a top-level filter is applied on top of the detection status of the full-blockage detector. For example, using a majority-voting processing over N frames, where N is an odd number (e.g., N can be 3 or 5), can be used to change the status of the filter. Using a top-level filter, the electronic device 200 can avoid flipping back and forth in a short duration and stabilize the detection result. It is noted that other low-pass type of filtering could also be used such as a weighted score across multiple detection.

In certain embodiments, a temporal correlation of the full-blockage status could be exploited by introducing the full-blockage state. For example, starting from not full-blockage state, the electronic device 200 can perform the normal full-blockage detection (either using each single radar frame separately or using the sliding windows as described in FIGS. 7A-10). At the same time, based on these detections, the electronic device 200 can collect evidence of whether the current situation is full-blockage. Upon the electronic device 200 gathering enough evidence to support a full-blockage situation, the electronic device uses a flag to indicate that the current situation is full-blockage state. While this flag is on (active), the electronic device 200 outputs full-blockage as the output from the full-blockage detection module regardless of the instantaneous detection result from the full-blockage detector. This is described in FIG. 11A. During this time, the electronic device 200 collect evidence of non-full-blockage state, and only when there is enough evidence to support non-full-blockage state that we turn off the flag.

The method 1100 as illustrated in FIG. 11A describes an example procedure of an electronic device using a full-blockage state to exploit the temporal correlation of full-blockage to stabilize detection results, thereby avoiding oscillation of the detection result between full-blockage and non-full-blockage in short period of time.

In step 1102, an electronic device (such as the electronic device 200) performs blockage detection. The blockage detection can be similar to any of the methods 700-1000 of FIGS. 7A-10, as described above.

In step 1104, the electronic device determines whether the full-blockage state is on (active). When the full-blockage state is on, it can indicate that multiple previous blockage detection results indicated that full blockage occurred. As such, regardless of the blockage detection as identified in step 1102, the electronic device 200 in step 1106, outputs an indication that the transceiver is fully blocked. For example, if the electronic device (i) in step 1102 determines that the transceiver is fully blocked or not fully blocked and (ii) the electronic device in step 1104 determines that the full blockage state is on, then the electronic device 200 in step 1106 outputs an indication that the transceiver is fully blocked.

Alternatively, when the full-blockage state is off (not on), indicates that multiple previous blockage detection results indicated that not full blockage occurred. For example, if the electronic device in step 1104 determines that the full blockage state is off, then the electronic device in step 1108 outputs the detection result from step 1102.

In certain embodiments, full-blockage and non-full-blockage state are determined by counting numbers of consecutive detection of full-blockage or non-full-blockage. For example, a threshold may be set to be any natural integer, (such as three). In this case, when there are three consecutive full-blockage detections, the full-blockage state may be turned on. Similarly for the non-full-blockage state, when there are three consecutive not full-blockage detections, the full-blockage state may be turned off. It is noted that the larger the threshold value, the longer the delay for determining the state transition.

In certain embodiments, upon a detection of strong evidence to support full-blockage or non-full-blockage (as defined above in FIGS. 8A and 8B), the electronic device 200 could switch on or off the flag thereby reducing the delay in the state transition. This example is described in FIG. 11B.

The method 1110 as illustrated in FIG. 11B describes an example process that counts the number of consecutive full-blockage (or non-full-blockage) for determining when to turn on (or off) the full-blockage state.

In step 1112, an electronic device (such as the electronic device 200) performs blockage detection. The blockage detection of step 1112 can be similar to the method 700 of FIG. 7A or the method 720 of FIG. 7B.

In step 1114, the electronic device 200 determines whether an indication that the transceiver is blocked is output. In response to a determination that the full blockage is detected, the electronic device in step 1116 determines whether there is strong evidence that the transceiver is blocked. The strong evidence can be similar to the strong evidence as described in FIGS. 8A and 8B. The strong evidence for full-blockage can be determined by checking whether the full-blockage is detected by the condition that there is at least one close-range tap falling below the lower detection threshold (such as the lower threshold 630 of FIG. 6), and that there is no far-range tap detected above the upper threshold (such as the upper threshold 620 of FIG. 6).

In certain embodiments, strong evidence that the transceiver is blocked is based on whether there is close range tap falling below the lower threshold and whether there is no far-range tap detected below the detection threshold. For example, when (i) there is close range tap below the lower threshold (such as the lower threshold 630 of FIG. 6A) and (ii) there is no far-range tap detected (all far range taps are below the upper threshold such as the upper threshold 620 of FIG. 6A), then in step 1116 the electronic device 200 determines that there is a strong evidence for full-blockage situation.

When there is strong evidence that the transceiver is blocked, the electronic device 200 in step 1122 turns the full-blockage state on. Alternatively, when there is no strong evidence that the transceiver is fully blocked, the electronic device in step 1118, counts a number of consecutive instances that the full blockage is detected.

In step 1120, the electronic device 200 compares the number of consecutive instances that full blockage was detected to a threshold. When the number of consecutive instances that full blockage was detected is greater than the threshold then the electronic device 200 in step 1122 turns the full-blockage state on. Alternatively, when the number of consecutive instances that full blockage was detected is not greater than the threshold then the electronic device 200 returns to step 1112 and performs another blockage detection.

In response to a determination that the full blockage is not detected (as determined in step 1114) the electronic device 200 in step 1124 determines whether there is strong evidence that the transceiver is not fully blocked. The strong evidence can be similar to the strong evidence as described in FIG. 8B. In certain embodiments, strong evidence that the transceiver is not fully blocked is based on whether a far range tap is detected. For example, the electronic device 200 determines that there is strong evidence that the transceiver is not fully blocked when an object is detected at a predefined distance from the electronic device 200. The predefined distance can be considered a far distance from the electronic device 200.

In certain embodiments, the far-range tap detection could be to set another upper threshold that could be larger than the upper detection threshold used for the instantaneous full-blockage detection to avoid false alarm by noise and erroneously switch the state.

When there is strong evidence that the transceiver is not fully blocked, the electronic device 200 in step 1130 turns the full-blockage state off. Alternatively, when there is no strong evidence that the transceiver is not fully blocked, the electronic device in step 1126, counts a number of consecutive instances that the full blockage is not detected.

In step 1128, the electronic device 200 compares the number of consecutive instances that full blockage was not detected to a threshold. When the number of consecutive instances that full blockage was not detected is greater than the threshold then the electronic device 200 in step 1130 turns the full-blockage state off. Alternatively, when the number of consecutive instances that full blockage was not detected is not greater than the threshold then the electronic device 200 returns to step 1112 and performs another blockage detection.

Although FIGS. 11A and 11B illustrate example methods, various changes may be made to FIGS. 11A and 11B. For example, while the method 1100 and the method 1110 are shown as a series of steps, various steps could overlap, occur in parallel, occur in a different order, or occur multiple times. In another example, steps may be omitted or replaced by other steps.

Figure 12:
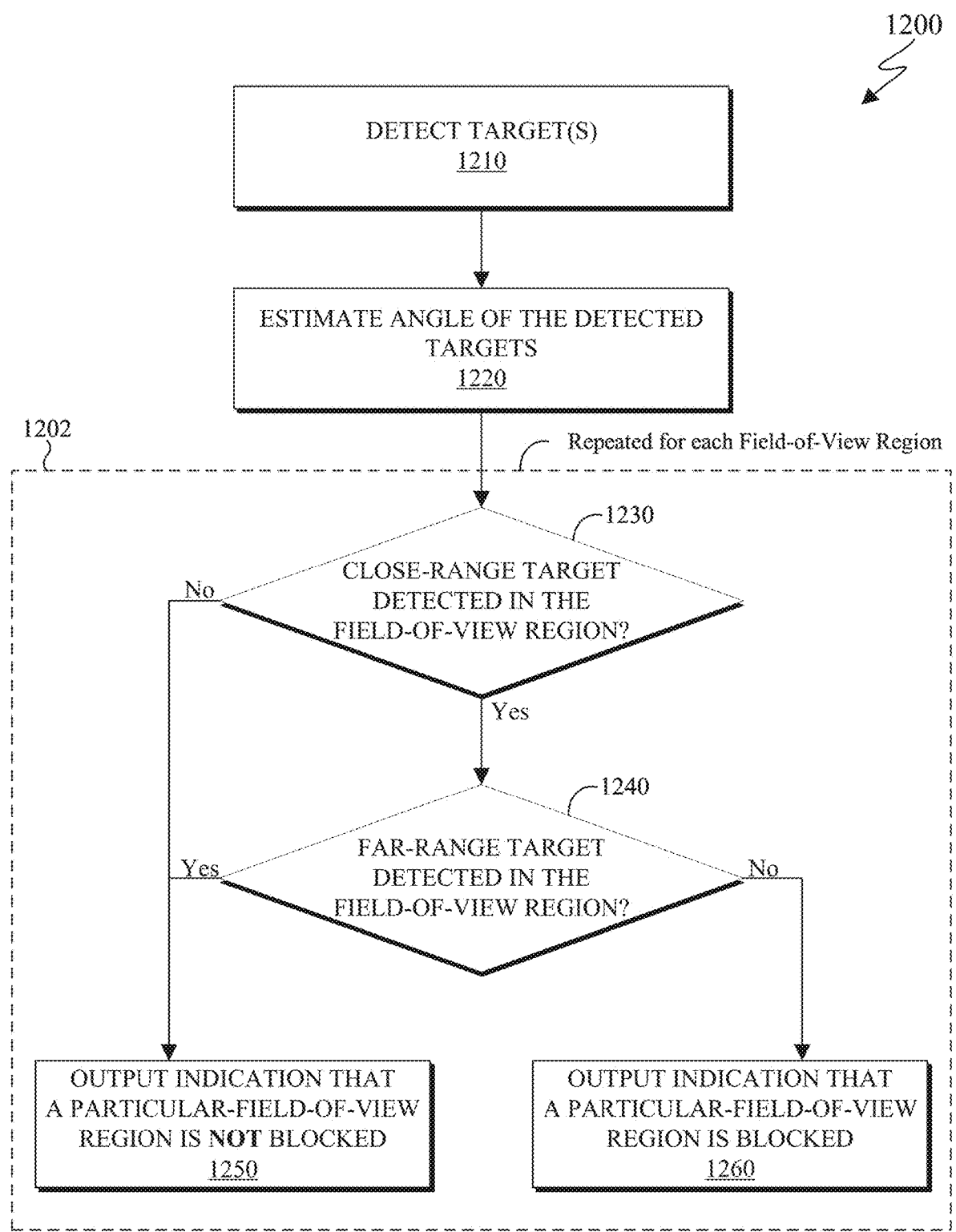
FIG. 12 illustrates an example method for determining whether a certain FoV of a transceiver of an electronic device is blocked according to embodiments of this disclosure.

FIG. 12 illustrates an example method 1200 for determining whether a certain FoV region of a transceiver of an electronic device is blocked according to embodiments of this disclosure. The method 1200 is described as implemented by any one of the client device 106-114 of FIG. 1, the electronic device 300 of FIG. 3A, the electronic device 402 of FIGS. 4A-4D and can include internal components similar to that of electronic device 200 of FIG. 2. However, the method 1200 as shown in FIG. 12 could be used with any other suitable electronic device and in any suitable system, such as when performed by the electronic device 200.

In certain embodiments, if the radar is capable of estimating the angle of the target relative to the electronic device with good accuracy (such as the FoV region 425 of FIG. 4B), the full blockage detection could be extended to determine FoV region blockage, which provides finer granularities for determining blockage situation. A FoV region (such as the FoV region 425a) is defined and an angular interval within the whole FoV (such as the FoV regions 425a, 425b, and 425c).

The method 1200 as illustrated in FIG. 12 describes an example process for blockage detection for one or more FoV regions.

In step 1210, an electronic device (such as the electronic device 200) detects all objects. In step 1220, the electronic device 200 estimates the angles for all detected objects.

The steps within block 1202 are repeated for each FoV region. The electronic device 200 identifies all the objects within the FoV regions. In step 1230, the electronic device 200 determines if there are any close-range object within the particular FoV region. When no objects are detected at the close range for a particular FoV region, then the electronic device 200 in step 1250 outputs an indication that the particular FoV region is not blocked.

When at least one close range object is detected within one of the FoV regions (as determined in step 1230), the electronic device 200 in step 1240 determines whether there are any far-range objects detected.

When no far-range objects are detected within the particular FoV region (as determined in step 1240), the electronic device 200 in step 1260 outputs an indication that the particular FoV region is fully blocked.

When at least one far-range object is detected within the particular FoV region (as determined in step 1240), the electronic device 200 in step 1250 outputs an indication that the particular FoV region is not fully blocked.

In certain embodiments, some overlap between adjacent FoV regions could be introduced. In that case, objects detected with their angles in the overlap region may be treated as belonging to those FoV regions with the overlap.

It is noted that multi-frame processing and the use of full-blockage state in the context of full-blockage (the entire FoV) are applicable here. A first exceptions include that the full-blockage state can be understood as the FoV blockage state, and that the condition (close range tap below the lower threshold) is not usable. A second exception does not cause any problem in executing the procedure since the electronic device 200 can just interpret the condition as false when executing in the context of FoV blockage detection. In an implementation, those procedures that use the condition (close range tap below the lower threshold) could be simplified with the interpretation that it is false and thus some of the branches could be deleted.

Although FIG. 12 illustrates example methods, various changes may be made to FIG. 12. For example, while the method 1200 is shown as a series of steps, various steps could overlap, occur in parallel, occur in a different order, or occur multiple times. In another example, steps may be omitted or replaced by other steps.

Figure 13:
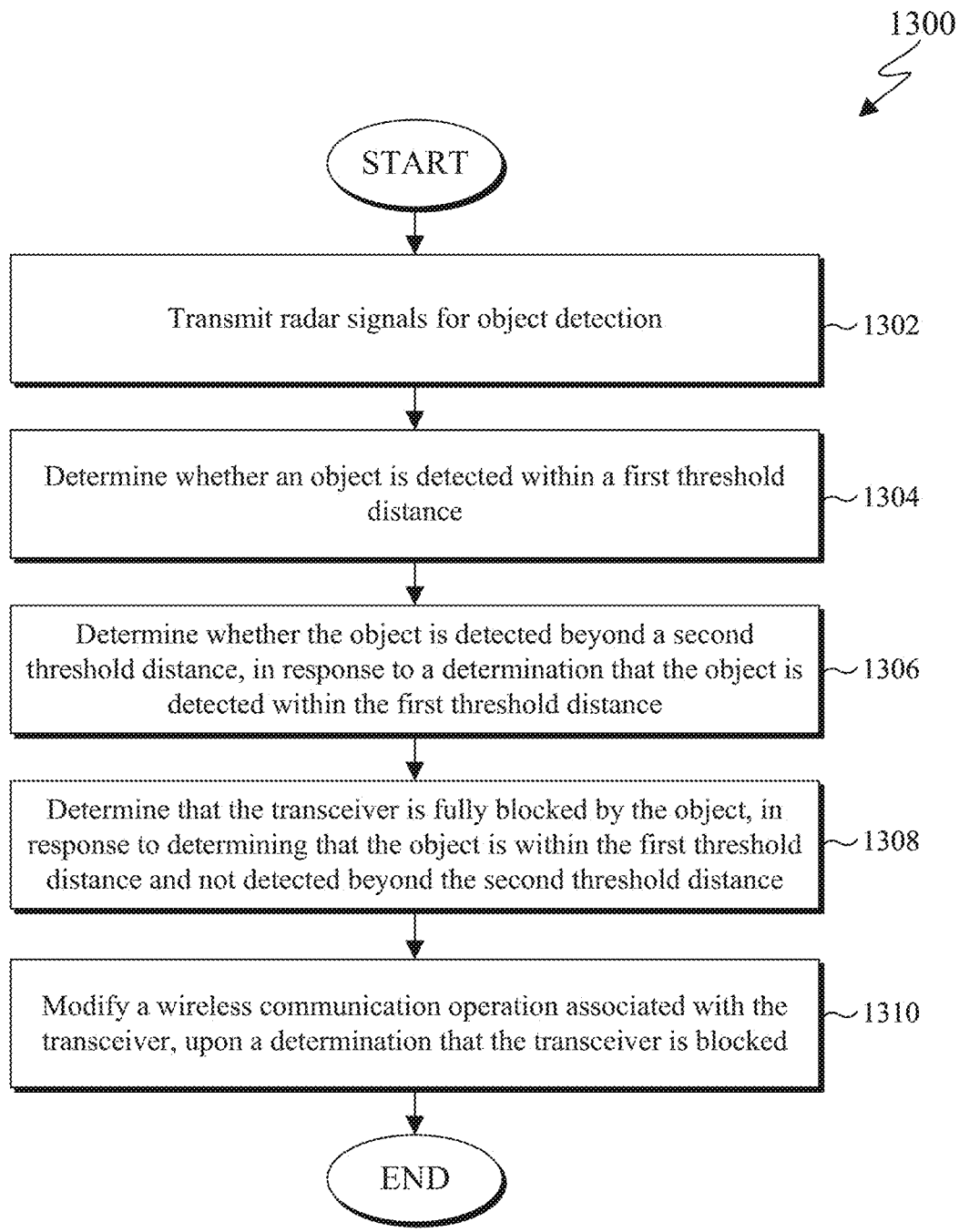
FIG. 13 illustrates an example method for blockage detection according to embodiments of this disclosure.

FIG. 13 illustrates an example method 1300 for full blockage detection according to embodiments of this disclosure. The method 1300 is described as implemented by any one of the client device 106-114 of FIG. 1, the electronic device 300 of FIG. 3A, the electronic device 402 of FIGS. 4A-4D and can include internal components similar to that of electronic device 200 of FIG. 2. However, the method 1300 as shown in FIG. 13 could be used with any other suitable electronic device and in any suitable system, such as when performed by the electronic device 200.

In step 1302, an electronic device (such as the electronic device 200) transmits signals for object detection. The electronic device 200 can also receive the transmitted signals that reflected off of an object via a radar transceiver, such as the radar transceiver 270 of FIG. 2. In certain embodiments, the signals are radar. The signals are used to detect an object with regions that expand from the electronic device.

In certain embodiments, the radar signals can be transmitted in frames that are separated by frame spacings. The transmission interval of a frame can be shorter than the frame spacing. The radar frames can include non-uniformly spaced radar pulses or uniformly spaced radar pulses.

In step 1304, the electronic device 200 determines whether an object is detected based on reflections of the radar signals. In certain embodiments, electronic device 200 determines whether an object is detected within a first threshold distance from the electronic device.

In order to determine whether an object is detected, the electronic device 200 generates a range-amplitude map representing signal strength of the reflected radar signals as a function of distance. To determine whether the object is detected within the first threshold distance, the electronic device 200 determines that the signal strength at a first set of taps is above an upper threshold.

In response to determining that the object is detected within the first threshold distance, the electronic device 200 in step 1306 determines whether an object is detected beyond a second threshold distance. To determine whether the object is detected beyond the second threshold distance, the electronic device 200 determines that the signal strength at a second set of taps is above the upper threshold.

In step 1308, the electronic device 200 determines that the transceiver is fully blocked by the object in response to determining that the object is within the first threshold distance and not detected beyond the second threshold distance.

Upon determining that the transceiver is fully blocked, the electronic device 200 in step 1310 modifies the wireless communication associated with the transceiver.

In certain embodiments, in response to a determination that the signal strength at a first set of taps is below an upper threshold (as determined in step 1304) the electronic device 200 determines whether the signal strength at a set of taps is below a lower threshold. The set of taps representing the first threshold distance. In response to a determination that the set of taps are not below the lower threshold, the electronic device 200 determines that the transceiver is not fully blocked. Additionally, in response to a determination that the set of taps are below the lower threshold, the electronic device 200 determine whether the object is detected beyond the second threshold distance (such as in step 1306).

The electronic device 200 can determine whether to use a current radar frame or multiple radar frames to detect the object. It is noted that the multiple radar frames include the current radar frame and one or more previous radar frames.

In certain embodiments, to identify whether to use a current radar frame or multiple radar frames to detect the object, the electronic device 200 identifies evidence that the transceiver is fully blocked using the current radar frame. To identify the evidence, the electronic device 200 determines that one or more taps that are within a first predefined distance from the electronic device, are below a lower threshold. To identify the evidence, the electronic device 200 also determines that all taps that are further than a second predefined distance from the electronic device are below an upper detection threshold, wherein the second predefined distance is further away from the electronic device than the first predefined distance. When the evidence indicates that the transceiver is fully blocked, the electronic device 200 modifies the wireless communication operation of transceiver (such as in step 1310). Alternatively, when the evidence indicates that the transceiver is not fully blocked, the electronic device 200 determines whether the object fully blocks the transceiver using the multiple radar frames.

In certain embodiments, to identify whether to use a current radar frame or multiple radar frames to detect the object, the electronic device 200 identifies evidence that the transceiver is not fully blocked using the current radar frame upon determining that the transceiver is not fully blocked using the current radar frame. To identify the evidence that the transceiver is not fully blocked, the electronic device 200 determines whether an object is detected beyond the second threshold distance. In response to the evidence indicating that the transceiver is not fully blocked, the electronic device 200 determines that the transceiver is not fully blocked. Alternatively, in response to the evidence indicating that the transceiver is fully blocked, the electronic device 200 determines, whether the object fully blocks the transceiver using the multiple radar frames.

In certain embodiments, prior to determining whether the transceiver of the electronic device 200 is fully blocked, the electronic device 200 determines whether a full blockage state of the electronic device is active. Thereafter, in response to a determination that the full blockage state of the electronic device is active, the electronic device 200 generates an output indicating that the transceiver is blocked regardless of whether the electronic device determines that the transceiver is fully blocked (in step 1308). Similarly, in response to a determination that the full blockage state of the electronic device is not active, the electronic device 200 generates a first output indicating that the transceiver is not fully blocked based on the determination that the transceiver is not fully blocked or generates a second output indicating that the transceiver is fully blocked based on the determination that the transceiver is fully blocked (step 1308). When the output indicates that the transceiver is fully blocked, the electronic device 200 modifies the wireless communication operation associated with the transceiver (such as in step 1310).

Although FIG. 13 illustrates example methods, various changes may be made to FIG. 13. For example, while the method 1300 is shown as a series of steps, various steps could overlap, occur in parallel, occur in a different order, or occur multiple times. In another example, steps may be omitted or replaced by other steps.

The above flowcharts illustrate example methods that can be implemented in accordance with the principles of the present disclosure and various changes could be made to the methods illustrated in the flowcharts herein. For example, while shown as a series of steps, various steps in each figure could overlap, occur in parallel, occur in a different order, or occur multiple times. In another example, steps may be omitted or replaced by other steps.

Although the figures illustrate different examples of user equipment, various changes may be made to the figures. For example, the user equipment can include any number of each component in any suitable arrangement. In general, the figures do not limit the scope of this disclosure to any particular configuration(s). Moreover, while figures illustrate operational environments in which various user equipment features disclosed in this patent document can be used, these features can be used in any other suitable system. None of the description in this application should be read as implying that any particular element, step, or function is an essential element that must be included in the claims scope.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. An electronic device comprising:
a transceiver; and
a processor operably connected to the transceiver, the processor configured to:
transmit, via the transceiver, radar signals for object detection;
determine whether an object is detected within a first threshold distance based on reflections of the radar signals that are received;
in response to a determination that the object is detected within the first threshold distance, determine whether the object is detected beyond a second threshold distance, based on the reflections of the radar signals, wherein the second threshold distance is farther away from the electronic device than the first threshold distance;
in response to a determination that the object is within the first threshold distance and not detected beyond the second threshold distance, determine that a field of view (FoV) of the transceiver is fully blocked by the object, and thereby determine that the transceiver is fully blocked by the object; and
upon a determination that the transceiver is fully blocked, modify a wireless communication operation associated with the transceiver.

2. The electronic device of claim 1, wherein:
the processor is further configured to generate a range-amplitude map representing signal strength of the reflected radar signals as a function of distance,
to determine whether the object is detected within the first threshold distance, the processor is configured to determine that the signal strength at a first set of taps is above an upper threshold; and
to determine whether the object is detected beyond the second threshold distance, the processor is configured to determine that the signal strength at a second set of taps is above the upper threshold.

3. The electronic device of claim 1, wherein the processor is further configured to:
generate a range-amplitude map representing signal strength of the reflected radar signals as a function of distance,
in response to a determination that the signal strength at a first set of taps is below an upper threshold, determine whether the signal strength at a set of taps is below a lower threshold, the set of taps representing the first threshold distance;
in response to a determination that the set of taps are not below the lower threshold, determine that the transceiver is not fully blocked; and
in response to a determination that the set of taps are below the lower threshold, determine whether the object is detected beyond the second threshold distance.

4. The electronic device of claim 1, wherein the processor is further configured to determine whether to use a current radar frame or multiple radar frames to detect the object, wherein the multiple radar frames include the current radar frame and one or more previous radar frames.

5. The electronic device of claim 4, wherein the processor is further configured to:
identify evidence that the transceiver is fully blocked using the current radar frame;
in response to the evidence indicating that the transceiver is fully blocked, modify the wireless communication operation of the transceiver; and
in response to the evidence indicating that the transceiver is not fully blocked, determine whether the object blocks the transceiver using the multiple radar frames.

6. The electronic device of claim 5, wherein to identify the evidence that the transceiver is fully blocked, the processor is configured to:
determine that one or more taps that are within a first predefined distance from the electronic device, are below a lower threshold; and
determine that all taps that are farther than a second predefined distance from the electronic device are below an upper detection threshold, wherein the second predefined distance is farther away from the electronic device than the first predefined distance.

7. The electronic device of claim 4, wherein the processor is further configured to:
in response to a determination that the transceiver is not fully blocked using the current radar frame, identify evidence that the transceiver is not fully blocked using the current radar frame;
in response to the evidence indicating that the transceiver is not fully blocked, determine that the transceiver is not fully blocked; and
in response to the evidence indicating that the transceiver is fully blocked, determine whether the object fully blocks the transceiver using the multiple radar frames.

8. The electronic device of claim 7, wherein to identify the evidence that the transceiver is not fully blocked, the processor is configured to determine that the object is detected beyond the second threshold distance.

9. The electronic device of claim 1, wherein the processor is further configured to:
determine whether a full blockage state of the electronic device is active;
in response to a determination that (i) the transceiver is not fully blocked and (ii) the full blockage state of the electronic device is active, generate a first output indicating that the transceiver is fully blocked based on the full blockage state of the electronic device being active;
in response to a determination that (i) the transceiver is fully blocked and (ii) the full blockage state of the electronic device is active, generate the first output based on the full blockage state of the electronic device being active;
in response to a determination that (i) the transceiver is fully blocked and (ii) the full blockage state of the electronic device is not active, generate the first output based on the determination that the transceiver is fully blocked;
in response to a determination that (i) the transceiver is not fully blocked and (ii) the full blockage state of the electronic device is not active, generate a second output indicating that the transceiver is not fully blocked based on the determination that the transceiver is not fully blocked and that the full blockage state of the electronic device is not active; and
modify the wireless communication operation associated with the transceiver based on a generation of the first output.

10. A method for radar blockage detection comprising:
transmitting, via a transceiver of an electronic device, radar signals for object detection;

determining whether an object is detected within a first threshold distance based on reflections of the radar signals that are received;
in response to a determination that the object is detected within the first threshold distance, determining whether the object is detected beyond a second threshold distance, based on the reflections of the radar signals, wherein the second threshold distance is farther away from the electronic device than the first threshold distance;
in response to determining that the object is within the first threshold distance and not detected beyond the second threshold distance, determining that a field of view (FoV) of the transceiver is fully blocked by the object, and thereby determining that the transceiver is fully blocked by the object;
upon a determination that the transceiver is fully blocked, modifying a wireless communication operation associated with the transceiver;
in response to a determination that no object is detected within the first threshold distance, outputting an indication that the transceiver is not fully blocked; and
in response to a determination that the object is within the first threshold distance and detected beyond the second threshold distance, outputting an indication that the transceiver is not fully blocked.

11. The method of claim 10, further comprising generating a range-amplitude map representing signal strength of the reflected radar signals as a function of distance,
wherein determining whether the object is detected within the first threshold distance, comprises determining that the signal strength at a first set of taps is above an upper threshold; and
wherein determining whether the object is detected beyond the second threshold distance, comprises determining that the signal strength at a second set of taps is above the upper threshold.

12. The method of claim 10, further comprising:
generating a range-amplitude map representing signal strength of the reflected radar signals as a function of distance;
in response to a determination that the signal strength at a first set of taps is below an upper threshold, determining whether the signal strength at a set of taps is below a lower threshold, the set of taps representing the first threshold distance;
in response to a determination that the set of taps are not below the lower threshold, determining that the transceiver is not fully blocked; and
in response to a determination that the set of taps are below the lower threshold, determining whether the object is detected beyond the second threshold distance.

13. The method of claim 10, further comprising determining whether to use a current radar frame or multiple radar frames to detect the object, wherein the multiple radar frames include the current radar frame and one or more previous radar frames.

14. The method of claim 13, further comprising:
identifying evidence that the transceiver is fully blocked using the current radar frame;
in response to the evidence indicating that the transceiver is fully blocked, modifying the wireless communication operation of the transceiver; and
in response to the evidence indicating that the transceiver is not fully blocked, determining whether the object blocks the transceiver using the multiple radar frames.

15. The method of claim 14, wherein identifying the evidence that the transceiver is fully blocked comprises:
determining that one or more taps that are within a first predefined distance from the electronic device, are below a lower threshold; and
determining that all taps that are farther than a second predefined distance from the electronic device are below an upper detection threshold, wherein the second predefined distance is farther away from the electronic device than the first predefined distance.

16. The method of claim 13, further comprising:
in response to a determination that the transceiver is not fully blocked using the current radar frame, identifying evidence that the transceiver is not fully blocked using the current radar frame;
in response to the evidence indicating that the transceiver is not fully blocked, determining that the transceiver is not fully blocked; and
in response to the evidence indicating that the transceiver is fully blocked, determining, whether the object blocks the transceiver using the multiple radar frames.

17. The method of claim 16, wherein identifying the evidence that the transceiver is not fully blocked comprises determining that the object is detected beyond the second threshold distance.

18. The method of claim 10, further comprising:
determining whether a full blockage state of the electronic device is active;
in response to a determination that (i) the transceiver is not fully blocked and (ii) the full blockage state of the electronic device is active, generating an first output indicating that the transceiver is fully blocked based on the full blockage state of the electronic device being active;
in response to a determination that (i) the transceiver is fully blocked and (ii) the full blockage state of the electronic device is active, generating the first output based on the full blockage state of the electronic device being active;
in response to a determination that (i) the transceiver is blocked and (ii) the full blockage state of the electronic device is not active, generating the first output based on the determination that the transceiver is fully blocked;
in response to a determination that (i) the transceiver is not fully blocked and (ii) the full blockage state of the electronic device is not active, generating a second output indicating that the transceiver is not fully blocked based on the determination that the transceiver is not fully blocked and that the full blockage state of the electronic device is not active; and
modifying the wireless communication operation associated with the transceiver based on a generation of the first output.

19. A non-transitory computer-readable medium embodying a computer program, the computer program comprising computer readable program code that, when executed by a processor of an electronic device, causes the processor to:
transmit, via a transceiver, radar signals for object detection;
determine whether an object is detected within a first threshold distance based on reflections of the radar signals that are received;
in response to a determination that the object is detected within the first threshold distance, determine whether the object is detected beyond a second threshold distance, based on the reflections of the radar signals, wherein the second threshold distance is farther away from the electronic device than the first threshold distance;

in response to determining that the object is within the first threshold distance and not detected beyond the second threshold distance, determine that a field of view (FoV) of the transceiver is fully blocked by the object, and thereby determine that the transceiver is fully blocked by the object; and upon a determination that the transceiver is fully blocked, modify a wireless communication operation associated with the transceiver.

20. The electronic device of claim 19, further containing instructions that when executed cause the processor to generate a range-amplitude map representing signal strength of the reflected radar signals as a function of distance, where to determine whether the object is detected within the first threshold distance, the non-transitory computer-readable medium further contains instructions that when executed cause the processor to determine that the signal strength at a first set of taps is above an upper threshold; and wherein to determine whether the object is detected beyond the second threshold distance, the non-transitory computer-readable medium further contains instructions that when executed cause the processor to determine that the signal strength at a second set of taps is above the upper threshold.

* * * * *